United States Patent [19]

Leonard

[11] Patent Number: 4,530,676
[45] Date of Patent: Jul. 23, 1985

[54] ADJUSTABLE-DRIVE-RATIO MULTIPLE-STEP BELT TRANSMISSION

[76] Inventor: Hamlin Leonard, 327 Hollow Tree Ridge Rd., Darien, Conn. 06820

[21] Appl. No.: 470,723

[22] Filed: Feb. 28, 1983

[51] Int. Cl.³ .......................... F16H 9/10; F16H 9/20
[52] U.S. Cl. ........................................ 474/49; 474/52; 474/53
[58] Field of Search ...................... 474/47, 49, 50, 52, 474/53, 133–135

[56] References Cited

U.S. PATENT DOCUMENTS

| | | | |
|---|---|---|---|
| 2,266,538 | 12/1941 | Evans | 474/49 |
| 3,636,786 | 1/1972 | Buck | 474/135 |
| 4,030,373 | 6/1977 | Leonard | 474/49 |

FOREIGN PATENT DOCUMENTS

| | | | |
|---|---|---|---|
| 3107255 | 2/1982 | Fed. Rep. of Germany | 474/49 |
| 1043195 | 11/1953 | France | 474/49 |

*Primary Examiner*—Stephen J. Novosad
*Assistant Examiner*—Bruce M. Kisliuk
*Attorney, Agent, or Firm*—Parmelee, Bollinger & Bramblett

[57] ABSTRACT

Adjustable-drive-ratio multiple-step transmission wherein a multiple-v belt passes around driving and driven pulleys each including movable sheave elements individually shiftable in discrete steps along respective trackways away from or toward the pulley axis for changing effective diameters for changing driving ratio (rotational speed relationship) between the two pulleys. In the appropriate rotation direction, either pulley can be driving or driven. Advantageously, the individual sheave elements are one-piece belt-load-locked units engaged with saw-toothed shaped steps along their respective individual trackways by action of belt force applied off-set to torque each sheave element in the plane of the pulley forcing its saw-toothed shaped gripping teeth into engagement with steps along one side of the trackway automatically retaining each sheave element in its shifted position when under belt loading. Trunnion-like projections extend from its opposite sides for shifting each sheave element by applying balanced forces to its opposite sides by a first pair of inner and outer shift cams on one side of each pulley and a second pair of inner and outer shift cams on the other side. When these cams are shifting sheave elements outwardly on one pulley they are simultaneously shifting sheave elements inwardly on the other pulley. These cams move parallel with the pulley plane for shifting the one-piece sheave elements in the pulley plane. A thin, compact belt transmission having numerous predetermined drive-ratios, involves few components, with all sheave elements economically injection molded.

49 Claims, 18 Drawing Figures

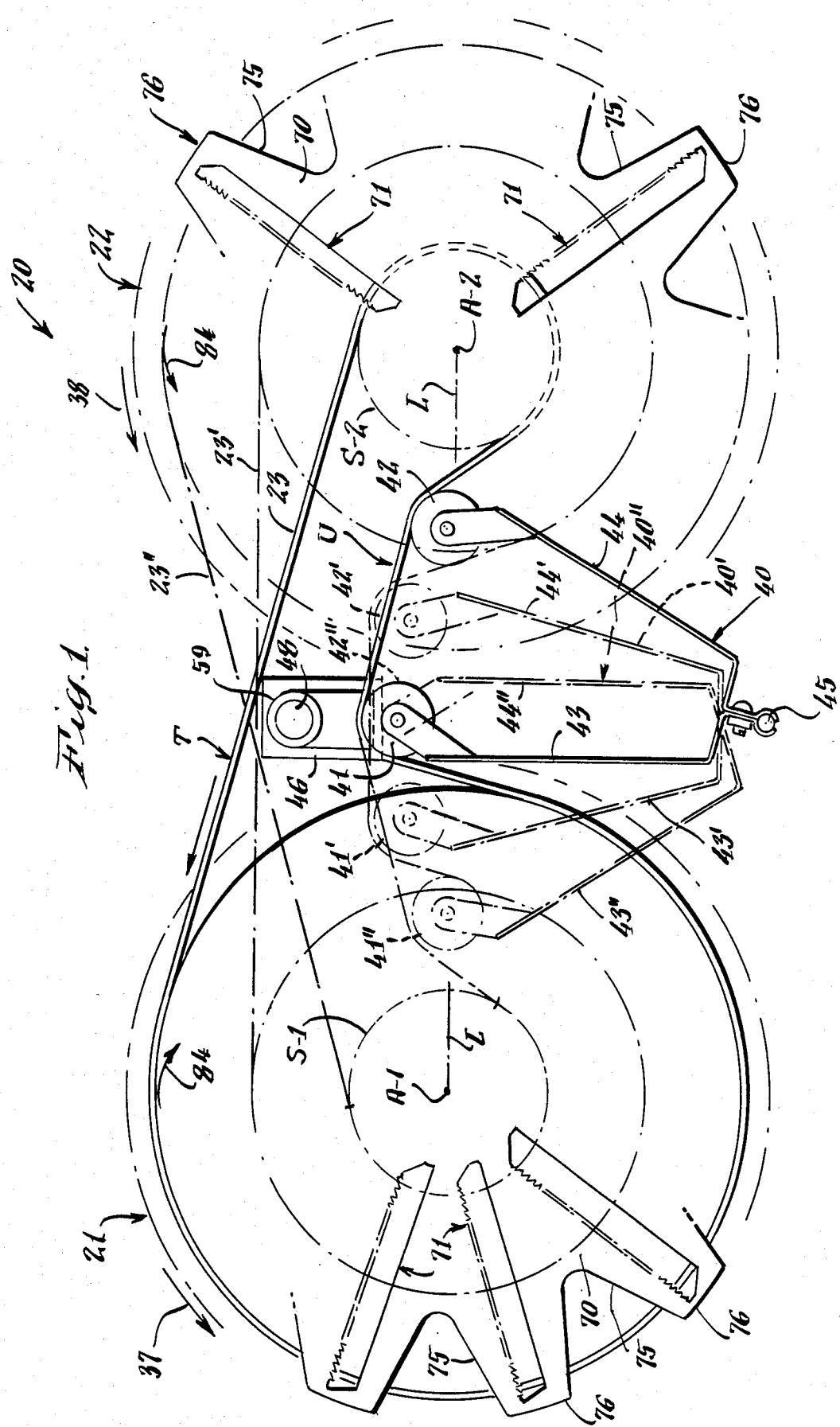

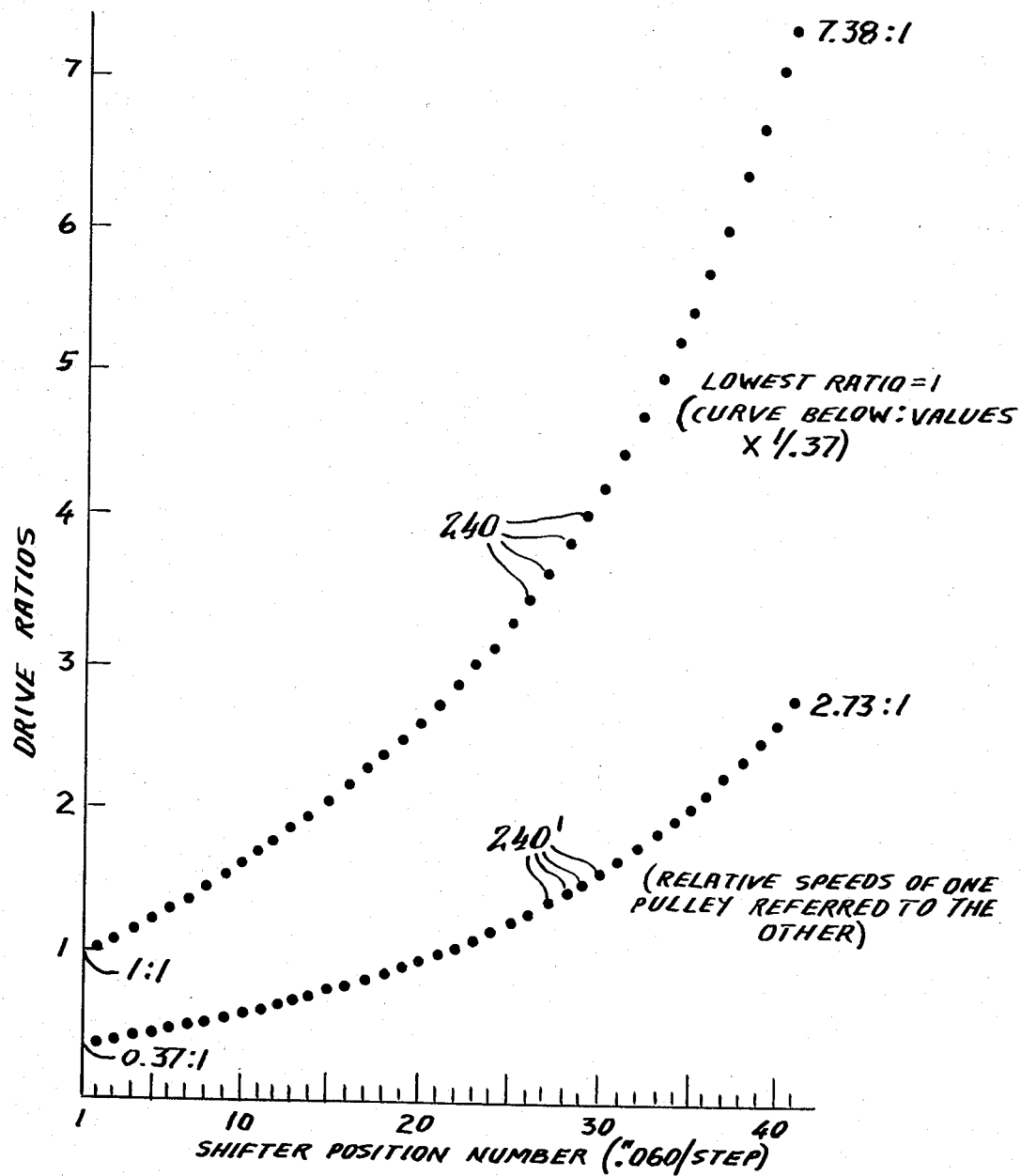

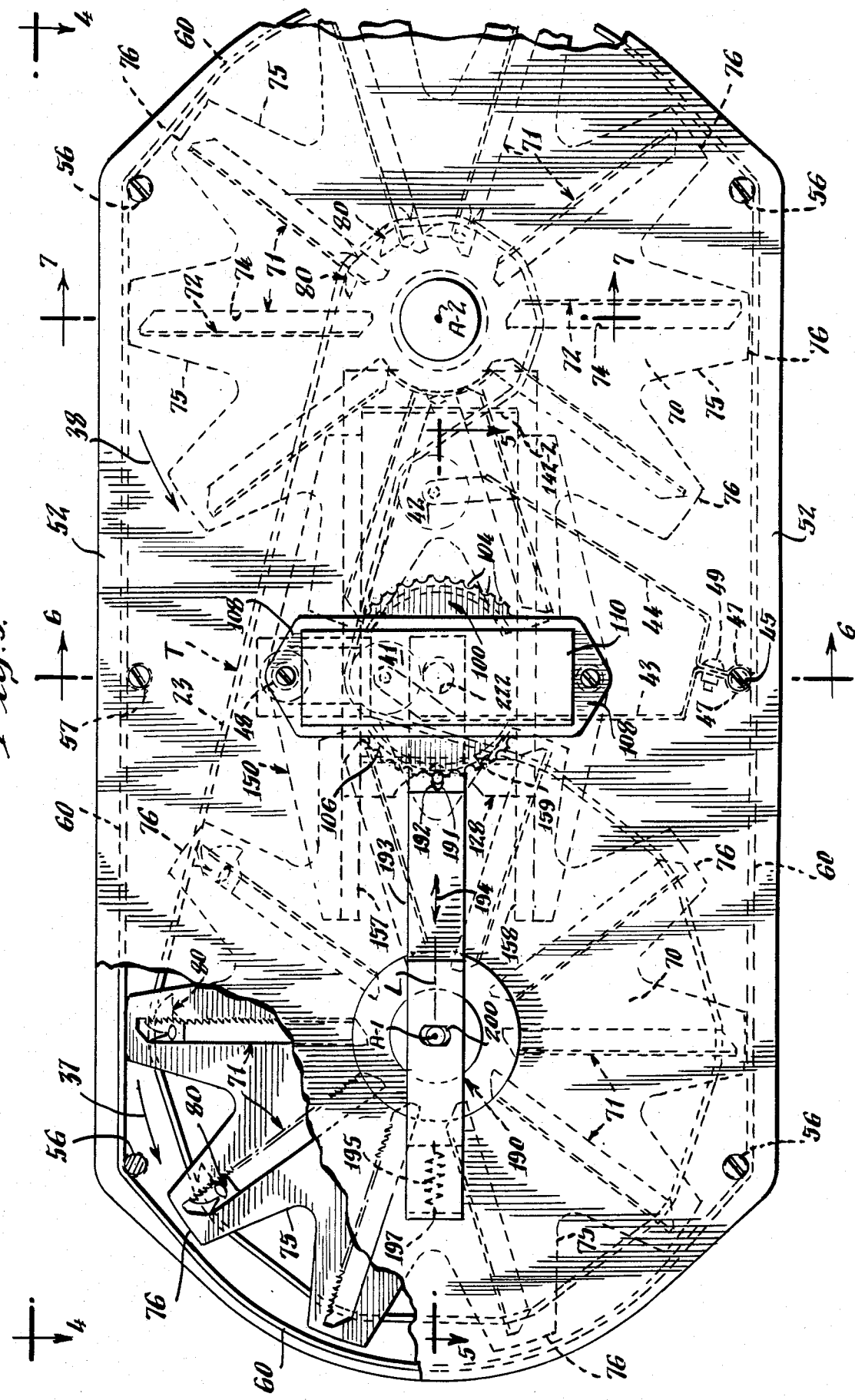

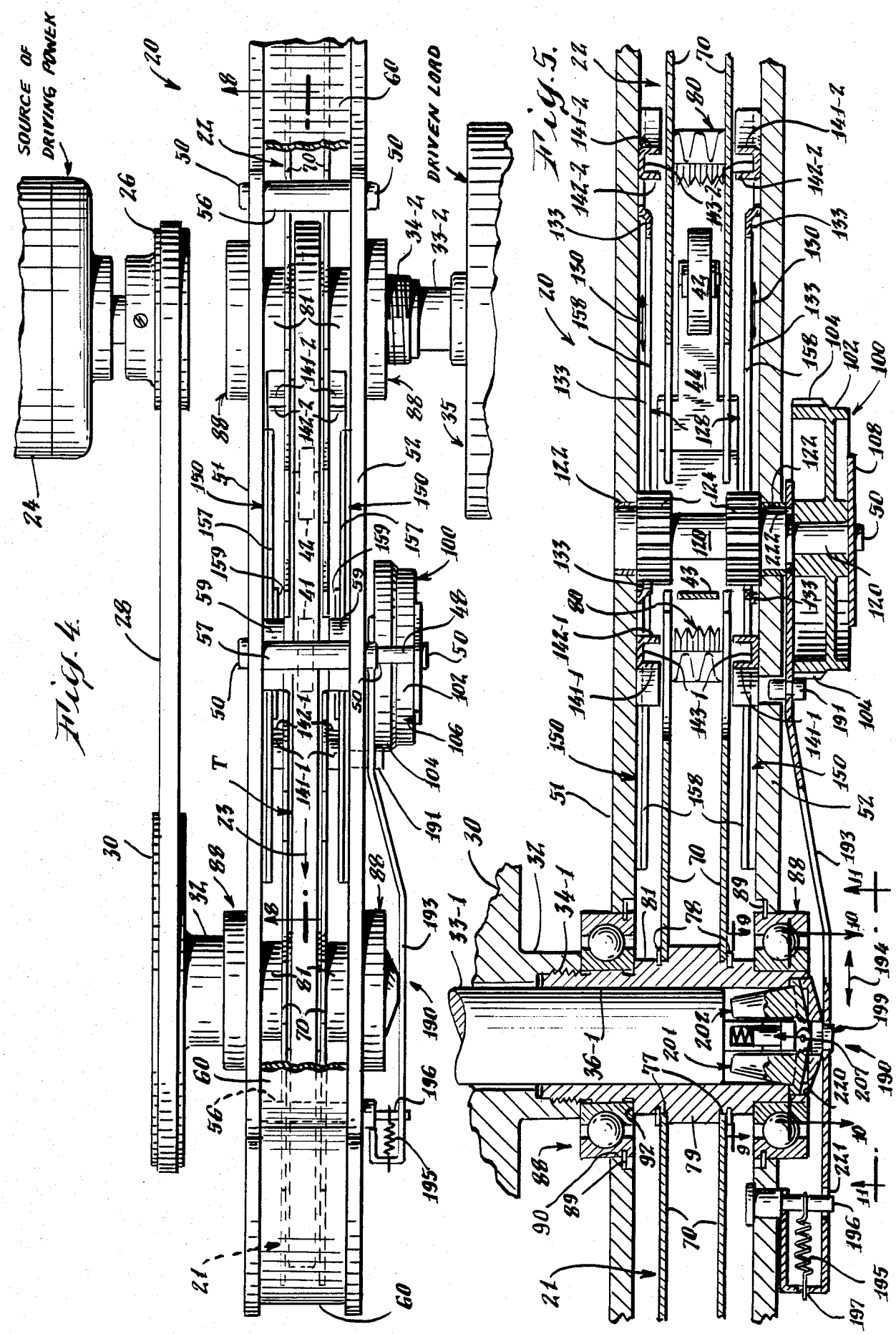

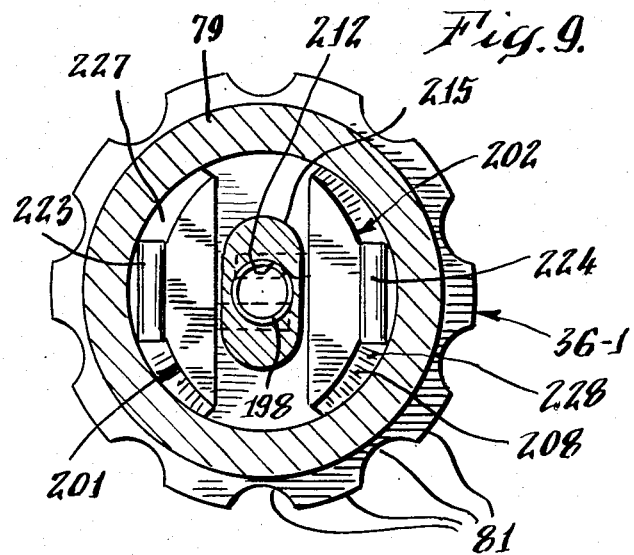
Fig. 9.
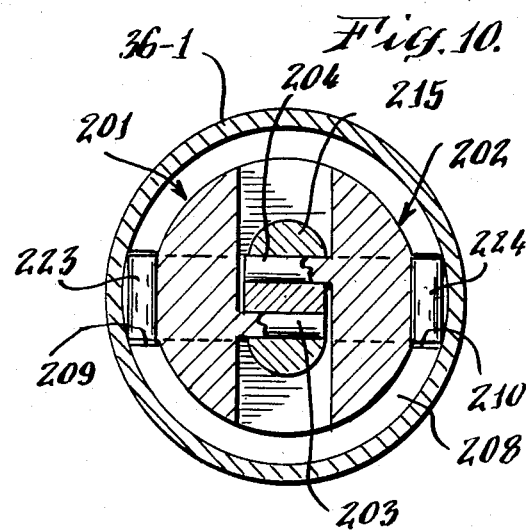
Fig. 10.
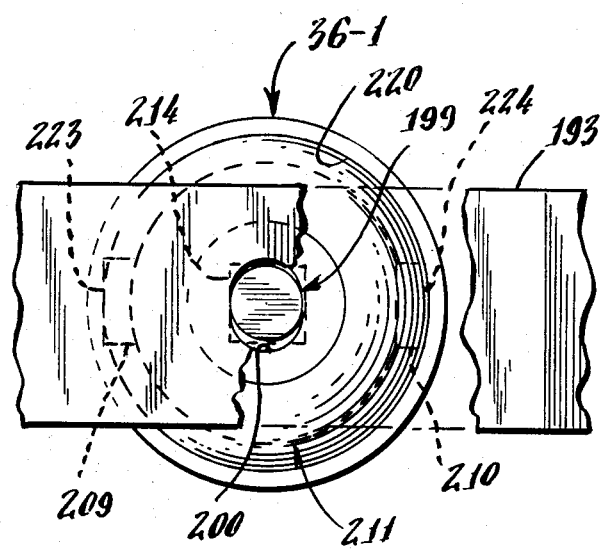
Fig. 11.
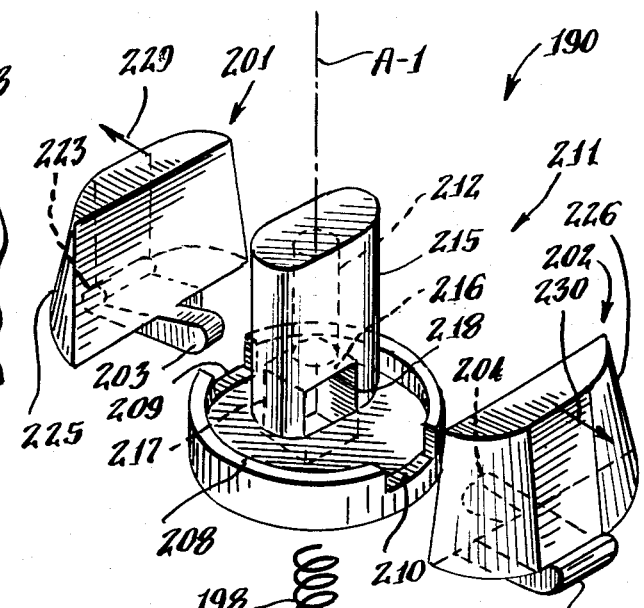
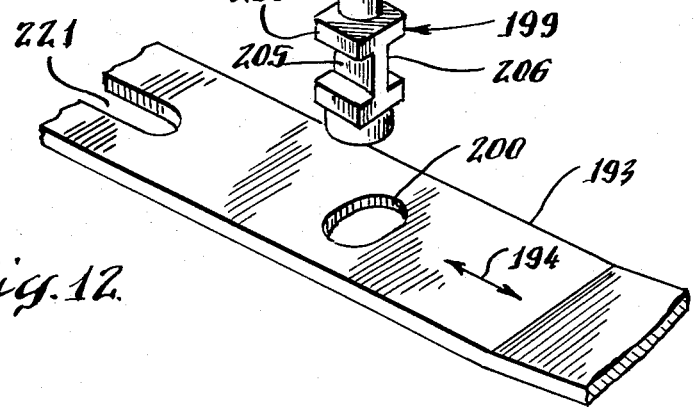
Fig. 12.

ADJUSTABLE-DRIVE-RATIO MULTIPLE-STEP BELT TRANSMISSION

FIELD OF THE INVENTION

The present invention is in the field of adjustable-drive-ratio, multiple-step belt transmissions.

BACKGROUND OF THE INVENTION

Variable speed drives utilizing a chain and sprockets involve a number of well-recognized problems, as described in U.S. Pat. No. 4,030,373, which issued June 21, 1977, and in which I am the inventor. That patent discloses a variable-speed drive suitable for use on a bicycle utilizing two belts and front and rear variable-diameter driving mechanisms. Each of these driving mechanisms included a plurality of sheave elements. Each sheave element was movable along a slot or track in a mounting plate, having serrated edges on both sides of the slot to normally retain the sheave element at a fixed radial position.

Each sheave element had releasable retaining means including a pair of locking dogs having external teeth which matched the serrations along both sides of the slot. Each sheave element also had a movable pin which extended in an axial direction from one side of the sheave element. That pin included a tapered region and was movable in an axial direction between the pair of locking dogs for spreading the dogs by a wedging action forcing their external teeth into engagement with the serrated edges on both sides of the slot. A small coil-spring normally urged the movable pin into wedging relationship between the locking dogs for spreading the dogs to cause the retention of the sheave element at a fixed position by the teeth on the dogs locking into the matching serrations on both sides of the slot.

The two belts straddled the mounting plate and engaged dual belt-carrying surfaces on the sheave elements, these dual belt-carrying surfaces being located on opposite sides of the single mounting plate.

It is my belief that the variable speed drive disclosed in that patent represented a significant technological advance over the prior "derailleur" chain and sprocket drives. However, that variable speed drive required two belts. Moreover, each sheave element was relatively complex, being an assembly with multiple moving parts, namely, including a pair of locking dogs, an axially-movable wedging pin, various rings formed on the shaft of this movable pin, an actuator head on the protruding shaft of this pin, and a coil-spring in a socket surrounding the shaft of this pin.

With two such belts straddling a mounting plate, it was difficult to keep the frictional grip equal on both belts. Therefore, one or the other of the two belts tended to pull more load than the other, thereby placing unbalanced forces on the sheave element assemblies on opposite sides in the axial direction. Also, the actuator pin head projecting axially out on one side of the sheave element assembly placed an unbalanced force on each sheave element assembly whenever radial forces were applied to the actuator pin heads for moving the sheave assemblies to new positions. Such unbalanced forces sometimes tended to jam the sheave element assemblies rather than moving them to their new positions.

The actuator pins of the sheave assemblies in these variable-diameter driving mechanisms were operated into their locking dog releasing positions by moving these pins axially. In practice, the tolerance problems of axial actuation of such pins proved difficult. A small wobble of the variable-diameter driving mechanism shown in said patent could cause some of the pins to miss their full actuation. Thus, in practice, a small wobble could cause not all of the sheave element assemblies to be actuated all of the time.

The complexities of the sheave element assemblies with their multiple parts caused them to be inordinately expensive.

In addition, the gates in the variable diameter driving mechanisms in said patent were adjusted radially by a screw-threaded rod. Therefore, these gates were adjustable by the bicycle user over a continuous range! In other words, these gates could be adjusted in position by indefinite amounts, depending upon how much the user rotated the screw-threaded rod. Since the gates were moved by indefinite amounts, the sheave element assemblies themselves became adjusted by indefinite amounts by the gates. For accommodating this (indefinite or random) positioning of the sheave element assemblies, the serrations along both edges of each slot in that variable speed drive were very fine. These serrations were made as fine as possible in order to try to accommodate the indefinite adjustment, but these serrations did have some physical size for their own strength. Thus, inevitably, there was conflict between the finite serrations and the indefinite adjustment; such conflict led to excessive wear and noise.

In order to lock the sheave element assemblies in place between such fine serrations, there was metal-to-metal locking action by the pair of locking dogs. The locking dogs were spread apart by the wedging action of the tapered portion of the axially movable pin discussed above and were held in their fully spread, locked condition by the full diameter portion of this pin. Because of these fine serrations, tolerances were critical. These critical tolerances plus the complexities of the sheave elements as discussed above caused them to be inordinately expensive.

SUMMARY OF THE DISCLOSURE

The present invention is directed to an adjustable-drive-ratio, multiple-step belt transmission requiring only a single belt. This single belt passes around a driving pulley and a driven pulley each including a plurality of movable sheave elements that are individually shiftable in discrete steps along respective trackways away from or toward the axis of rotation of the respective pulleys for changing the effective diameter of the pulleys, thus changing the driving ratio (rotational speed relationship) between the two pulleys. As long as the pulleys are turned in the appropriate direction, either pulley can serve as the driving or driven pulley.

Advantageously, the individual sheave elements are one-piece belt-load-locked units which are caused to engage firmly with saw-toothed shaped steps along their respective individual trackways by the interaction of the belt force with the sheave element. In other words, these novel sheave elements do not involve an assembly of parts. They are one-piece units which are strong and lightweight, being molded from fiber-reinforced durable plastic. These novel sheave elements can be produced in large quantities by injection molding or other similar, mass-production techniques.

A transmission embodying the present invention is extremely efficient under full load. According to my static measurements, its efficiency under full load equals 98%. A well-lubricated, completely clean bicycle chain and sprocket transmission has an efficiency of about 96% when being pulled straight in one plane, but in most instances the chain is distorted into two different planes in running between non-aligned sprockets in a bicycle transmission.

The present transmission is light in weight and compact and quiet in operation. The parts are long-lived and essentially maintenance-free. The one-piece sheave elements are preferably injection-molded from glass-fiber-reinforced Nylon plastic material. Nylon plastic material tends to coat the glass fibers, thereby preventing raw fibers from coming to the surface. Thus, good bearing surfaces are preserved for enabling the sheave elements to be easily slid along their respective trackways in the pulley disc members for changing drive ratios.

Also, the reinforced Nylon plastic material has a specific gravity less than one-sixth that of zinc, thereby advantageously reducing the centrifugal force acting on the sheave segments for minimizing the tendency for them to become dislodged when they are "unloaded" (not-in-contact-with-the-belt), as compared with sheave segments made of zinc. This plastic material has a Young's modulus of elasticity of less than 2,000,000 pounds per square inch for providing appropriate resilient spring force in an integrally molded spring-finger for enabling the sheave segments to be shifted while using only a moderate radially-applied shifting force. These one-piece injection-molded sheave elements are tough, durable, light in weight and very economically produced in large quantities.

In operation, these one-piece sheave elements are advantageously self-locking in position. The belt load is applied in a circumferentially offset position on each sheave element, thereby tending to torque the sheave element in the plane of the pulley in the direction for forcing the saw-toothed shaped gripping teeth on the movable sheave element into engagement with the fixed steps along one side of the trackway for automatically retaining each sheave element in its desired position along its own trackway. As the sheave elements in the pulley revolve around the axis of the pulley, there is one relatively small portion of each revolution in which the belt does not engage the sheave elements. Thus, the one-piece sheave elements become unloaded from the belt force, and consequently they automatically become free of the belt-load-locking-phenomenon, and can then be shifted to a new position, if desired.

Each sheave element is balanced on opposite sides in the axial direction with respect to actuation. Each one-piece sheave element in the driving and driven pulley includes a pair of trunnion-like projections extending from its opposite sides in the axial direction for use in shifting the sheave element by applying balanced forces to its opposite sides acting to shift the position of the sheave element along its trackway.

Whereas the slots in the mounting plate as described in said patent were serrated along both edges, the self-locking action of the one-piece sheave elements of the present invention is obtained by saw-tooth shaped steps positioned along only one side of the trackway, and the other side of the trackway is smooth.

In order to shift the position of the sheave elements, there is a first pair of inner and outer shift cams on one side of each of the driving and driven pulleys and a second pair of inner and outer shift cams on the other side of each of these pulleys. When these shift cams are causing the sheave elements on the driving pulley to shift outwardly to a larger effective diameter they are simultaneously causing the sheave elements in the driven pulley to shift inwardly to a smaller effective diameter, and vice versa. Advantageously, these shift cams are all moved parallel with the plane of the controlled pulleys, and the one-piece belt-load-locked sheave elements are correspondingly shifted in the plane of the pulleys to the desired effective diameter positions, i.e. to the desired drive-ratio positions. A pair of symmetrical shift plates produces the simultaneous motion of all of the pairs of shift cams.

The present invention provides a strong, light-weight belt transmission using a single belt. A relatively thin and compact belt transmission is advantageously provided capable of being shifted into a relatively large number of predetermined drive-ratios, involving relatively few components and in which all of the sheave elements are identical belt-load-locked units which can be economically mass-produced by injection molding, for example, of durable plastic. In addition, this compact transmission of the present invention is relatively efficient as compared with the adjustable cone pulley type of transmission.

The conventional V-groove belt transmission must have considerable continual tension on the belt. For example, the V-belts in an automobile are quite taut for preventing slippage. In such a conventional V-groove arrangement, the amount of "wrap" of the V-belt around one or more of the pulleys is often far less than 180°. The V-belt must be quite tight to avoid slipping. Such tightness causes wear and tear on the V-belt and imposes heavy side-loading on the pulley shaft bearings, causing heating, relatively rapid wear of bearings and loss of efficiency. Moreover, the V-belt is under this taut condition all of the time, even when the transmission is not in use. Thus, the V-belt is continually being stretched by its tautness, leading to slippage which requires moving the pulleys farther apart for re-tightening the stretched slipping V-belt.

In marked distinction to a prior art V-belt transmission, the multiple-v belt in this transmission has a "wrap" of much more than 180° around the pulley. When the transmission is not in use, the multiple-v belt is under a very modest tension of only a few ounces. This modest tension is also present in the portion of the belt returning from the driving pulley to the driven pulley when the transmission is operating. This advantageous low tension reduces wear and tear on the belt and on the pulley bearings and reduces friction losses and heating.

This compact transmission is adapted to be used for a wide variety of drive applications, including those using human strength as the power source and those using motors or engines or other mechanical driving means as the power source. The types of human-drive applications in which the present transmission can be utilized to advantage include, for example, bicycles, tricycles, pedal-driven carts and wagons. The types of mechanical-driving-power-source applications in which the present transmission can be utilized to advantage include, for example, machine tools, fans and blowers, small vehicles, motorcycles, conveyors, etc.

In the illustrative embodiment of this invention there is a single multiple-v belt. Both pulleys are identical and are interchangeable thus saving in manufacturing costs.

Among the further advantages provided by the present invention are those resulting from the fact that the single multiple-v belt achieves a "wrap" around each pulley in an amount of at least 230° in all adjusted positions, whereas the dual belts in the variable speed drive in that patent were limited to a "wrap" of only 190° around the rear variable diameter driving mechanism. In order to prevent slippage of the dual belts in said prior drive for high driving ratios (small rear pulley diameter), there was required a *significant* backward-pulling tension force on the belt provided by a spring-loaded belt-tensioning device, as shown in FIG. 2 of said patent.

It is noted that the frictional grip achieved by an elongated flexible element, such as a rope or belt, wrapped around a round object is calculated in accordance with the formula:

$$\text{Friction Grip Multiplication} = e^{\mu\theta}$$

where "e" is the natural logarithm base 2.71828..., "$\theta$" is the angle of wrap in radians, and "$\mu$" is the effective coefficient of friction. By virtue of the characteristics of the modern multiple-v belt, the coefficient of friction is at least 3. Thus, with a "wrap" of 190° in the prior variable drive, the friction grip multiplication calculated from said formula is of the order of 20,918. With the present "wrap" of at least 230°, the friction grip multiplication calculated from said formula is of the order of 169,867, namely, more than eight times as large! Therefore, the backward pulling tension force on the belt required to prevent slippage is less than one-eighth as much, thereby contributing further to the efficiency of this transmission. The illustrative embodiment of this novel adjustable drive-ratio transmission provides 41 shifted positions in each of the two pulleys and uses a single flexible multiple-V belt, and provides an adjustment in the drive-ratio (rotational speed relationship) between driving and driven pulleys over a range of 7.38 to 1 in 40 uniformly graduated steps located along a smooth curve as illustrated.

An automatic centrifugal-action-actuated safety interlock mechanism is provided for preventing the user from attempting to shift the drive ratio, unless the driving pulley of the transmission is running above a predetermined minimum speed, for preventing the user from inadvertently jamming or damaging the transmission.

Many prior art variable speed transmissions must operate in a lubrication bath. If a mechanic attempted to punch holes in the casing of such a prior transmission for mounting purposes, the lubrication would leak out through the holes. This present transmission does not require a lubrication bath. Thus, a mechanic can punch mounting holes in the casing if desired without causing any loss of lubricant. Also, the relatively thin, flat compact and light-weight features of this transmission facilitate its mounting in a multitude of ways as may be convenient for a wide variety of customer applications.

In addition to its many advantages for adjustable-drive ratio transmissions, this invention provides a practical manually-adjustable-diameter pulley for fixed-ratio transmission applications. In other words, the pulley is manually adjusted to a particular diameter and then is used as a fixed-diameter pulley of that particular diameter. Consequently, there is a great flexibility and adaptability for the user in accommodating to the parameters of various installations, including the limitations of available belt lengths. One pulley embodying the present invention will cover the range of a large number of stock pulleys, thus drastically slashing inventory requirements for anyone who stocks pulleys. Also, one pulley provides adjustments in diameter in evenly spaced increments substantially smaller than available in present commercially stocked pulleys. Therefore, the economic savings to pulley distributors and users will be very significant in years to come.

BRIEF DESCRIPTION OF THE DRAWINGS

The invention, together with further objects, features, advantages and aspects thereof will become more clearly understood from a consideration of the following description in conjunction with the accompanying drawings in which like reference elements will bear the same reference numerals throughout the various views. The drawings illustrate this invention in the best mode now contemplated for putting this invention into practice.

FIG. 1 is a front view diagram of an adjustable-drive-ratio, multiple-step belt transmission embodying the present invention. FIG. 1 illustrates both adjustable-diameter pulleys, the belt, resilient take-up (or tensioning) means for the belt and intermediate belt guide means. This first view indicates three adjusted positions of the belt, namely, maximum, median and minimum driving ratios.

FIG. 2 shows plots of drive ratios versus the 41 positions of the shifter control. These 41 positions are numbered from 1 to 41 on a scale to be described later. The upper plot in FIG. 2 shows the drive ratio (i.e. rotational speed) of the output (driven) pulley relative to the input (driving) pulley. In other words, in presenting this upper plot, the lowest drive ratio is considered as having a value of unity, and then the highest drive ratio has a value 7.38 times greater than the lowest. The lower plot shows the relative rotational speeds of the output and input pulleys. In other words, in presenting this lower plot the median drive ratio (equal pulley diameters) is considered as having a value of unity, and then comparatively the lowest and highest ratios are 0.37 to 1 and 2.73 to 1, respectively.

FIG. 3 is a front elevational view similar to FIG. 1 and showing the transmission as a whole. FIG. 3 is drawn on the same scale as FIG. 1.

FIG. 4 is a top view of the transmission as seen from 4—4 in FIG. 3. FIG. 4 is drawn on the same scale as in FIGS. 1 and 3.

FIG. 5 is a top plan sectional view taken along the line 5—5 in FIG. 3 and being drawn somewhat enlarged as compared with FIG. 3.

FIG. 9 is an enlarged partial sectional view taken along the line 9—9 in FIG. 5 illustrating part of the automatic centrifugal-action-actuated safety interlock mechanism.

FIG. 10 is an enlarged partial sectional view of the automatic safety interlock mechanism, being a section taken along 10—10 in FIG. 5.

FIG. 11 is a front view of a portion of the interlock mechanism as seen from the position 11—11 in FIG. 5.

FIG. 12 is an exploded perspective view of the centrifugal-action-actuator-means.

FIG. 13 is an enlargement of the very top left region of FIG. 3.

Figure 6:
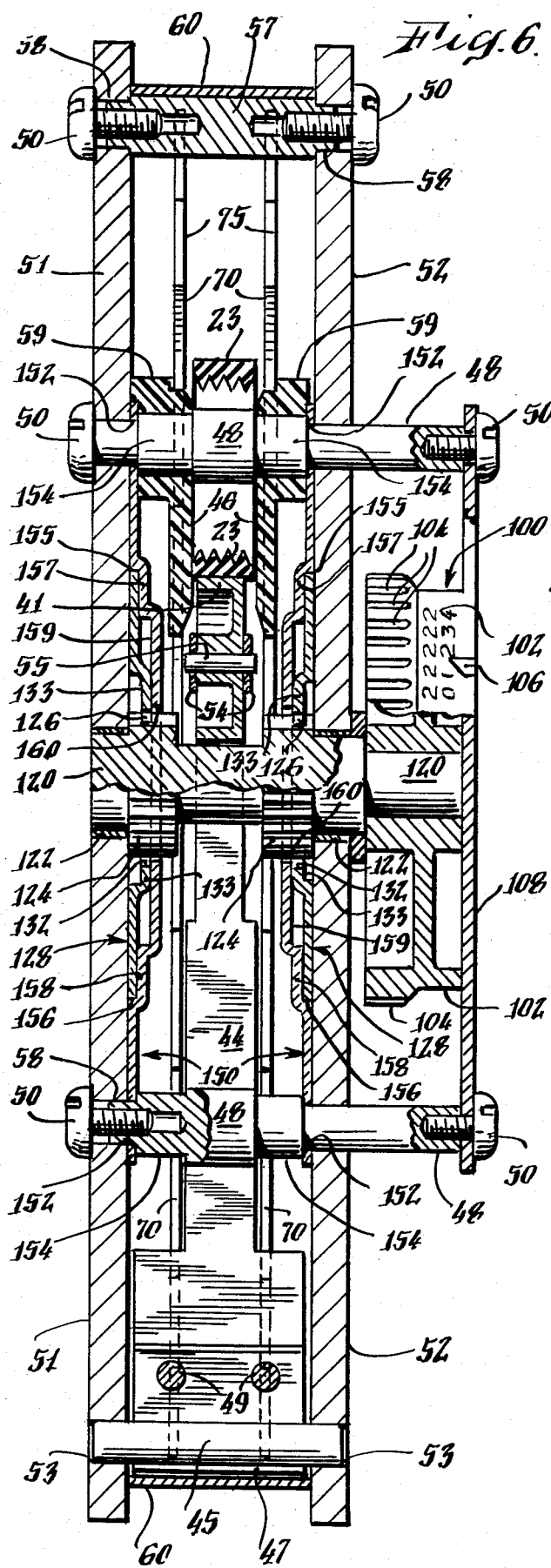
FIG. 6 is a cross-sectional view taken along the line 6—6 in FIG. 3 passing through the adjustment control means and also showing the belt in section and the resilient take-up (tensioning) means for the belt.

DETAILED DESCRIPTION OF PREFERRED EMBODIMENT OF ADJUSTABLE-RATIO, MULTIPLE-STEP BELT TRANSMISSION

Inviting attention to FIG. 1, there is shown the adjustable-ratio, multiple-step belt transmission 20 embodying the present invention. This transmission 20 includes a driving pulley 21, a driven pulley 22, and a single multiple-v endless belt 23. This belt 23 is a commercially available v-ribbed elastomer belt reinforced by a high tensile strength and low-stretch web of fiber material, for example, cords of "Kevlar" (duPont Trademark) material. The specific designation for this multiple-v belt is a J-section, v-ribbed reinforced elastomer belt having four ribs. The driving and driven pulleys 21 and 22 are identical, as discussed in the introduction, thus providing manufacturing economies. Either pulley can serve as the driving or driven pulley, provided that the pulleys are rotated in the appropriate direction. The appropriate direction of rotation maintains the straight flight portion T of the belt 23 in tension while the U-shaped flight portion U of the belt is under very low tension. In this illustrative transmission 20 the pulley 21 is arranged to be the driving (input) pulley and the pulley 22 is the driven (output) pulley.

Figure 7:
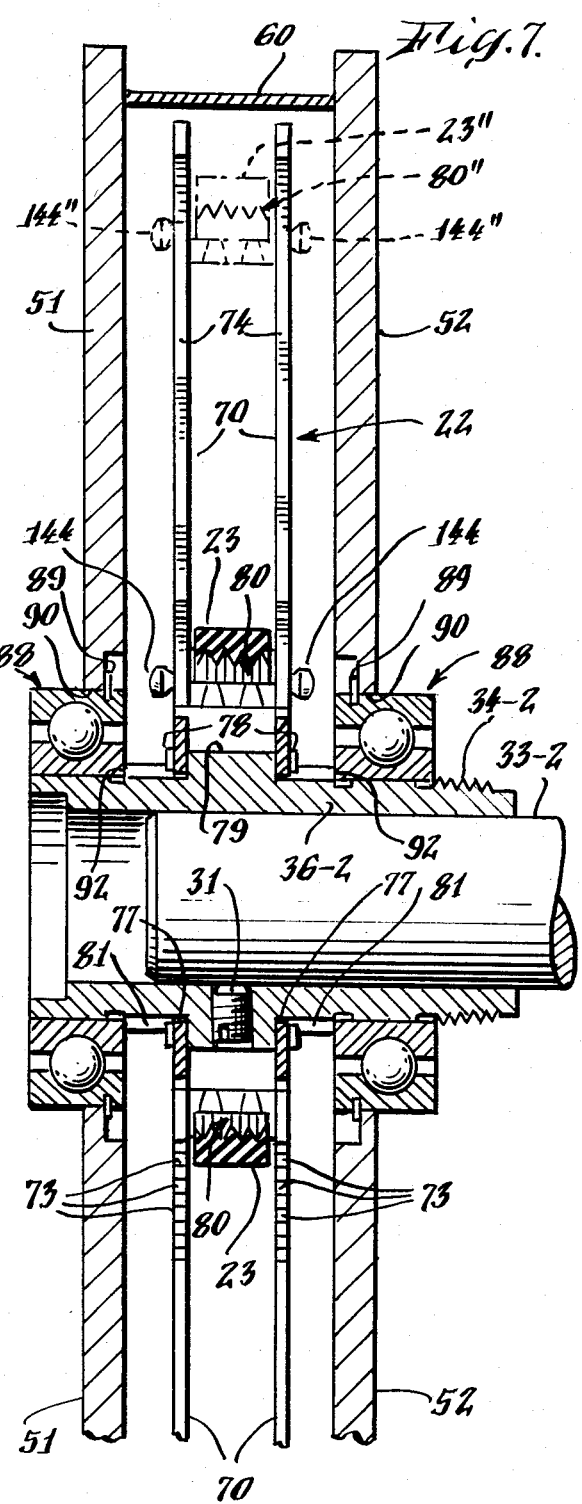
FIG. 7 is a cross-sectional view taken along the line 7—7 in FIG. 3 passing through the axis of the driven pulley.

As shown in FIG. 4, an electric motor 24 is being used as the driving source for this transmission. As described in the introduction, any appropriate driving source may be used. For example, pulley 26, belt 28 and pulley 30 represent a conventional multiple-v drive system. Pulley hub 32 (See also FIG. 5) is connected to the driving pulley 21 of the present adjustable transmission by being screwed at 34-1 onto the hollow shaft 36-1 of the driving pulley 21. This pulley 21 rotates in the counterclockwise direction, as shown by the arrow 37 (FIG. 1), thereby applying tension to the straight flight portion T of the belt 23 for rotating the driven pulley 22, as shown by the arrow 38 (FIG. 1). A hollow shaft 36-2 (FIG. 7) of the driven pulley 22 advantageously enables the output power to be mechanically transferred to the driven load 35 (FIG. 4), for example, a machine tool, fan or blower, vehicle drive, conveyor, etc. by a variety of different mechanical connections, as may be desirable for any particular application. For example, the threaded region 34-2 (FIGS. 4 and 7) of this hollow shaft 36-2 may be used to make the mechanical connection. Alternatively, a shaft 33-2 (FIG. 4) can be inserted as shown in FIG. 7 into the bore of this shaft 36-2 to be mechanically connected in the bore of the hollow shaft 36-2 by any appropriate mechanical connection means 31, for example, by a key and keyway, by a spline connection or by a set screw.

It is to be understood that the hollow shaft 36-1 of the input pulley 21 similarly advantageously enables the input power to be mechanically coupled to this hollow shaft 36-1 by any appropriate mechanical connection means. The shaft 33-1 in FIG. 5 is included merely for the purpose of indicating to the reader that mechanical power can be coupled into the hollow shaft 36-1 in other ways in addition to the use of the threaded region 34-1. It will be understood by those familiar with the machine tool industry that a spline connection in the hollow output shaft 36-2 will enable the output power shaft 33-2 (FIGS. 4, 7) to be moved axially while being rotated by this transmission 20 for accomplishing drilling, boring, or other machining operation, involving axial motion of a driven rotating shaft or arbor.

In order to guide and to apply take-up to the slack U-shaped flight portion U (FIG. 1) of the belt 23, and in order to achieve a large "wrap" around each pulley, belt-wrap guidance and tensioning means 40 (FIG. 1) are provided having a resilient wishbone configuration with twin flangeless (non-flanged) belt guide rollers 41 and 42. These lightweight flangeless idler guide rollers 41, 42 are formed of injection-molded rigid resin material, for example, Nylon, or equivalent, and are rotatably mounted on the ends of the respective resilient arms 43 and 44 of the belt-guidance and tensioning means 40. This wishbone structure 40 can swing back and forth as shown by the dash-and-dot outlines at 40', 40", 41', 41", 42', 42", 43', 43", 44', 44" around the axis of a pivot pin 45 for accommodating the many different adjusted positions of the belt 23, 23', 23". Moreover, the resilient arms 43 and 44 can flex for yielding slightly toward or away from each other in order to allow the flangeless guide rollers 41 and 42 to accommodate the changing belt geometries. These resilient arms 43 and 44 are formed of thin steel strip, and they are continually gently urging the two flangeless guide rollers 41 and 42 to spread apart from each other as far as the U-shaped belt portion will allow. The resultant belt tension force is very slight in the order of a few ounces as contrasted with the many pounds of tension required in a conventional belt transmission.

As seen in FIGS. 3 and 6, the two wishbone arms 43 and 44 of the belt-tensioning and wrapping guide means 40 include enlarged clamp portions 47 at their base ends secured by bolts and nuts 49 in clamping relationship on the pivot pin 45. The ends of this pivot pin are journaled in bearing holes 53 (FIG. 6) located in the two spaced, parallel main frame plates 51 and 52 of the transmission 20. These frame plates 51, 52 both have a neat rectangular shape with rounded ends, as seen in FIG. 3.

Figure 8:
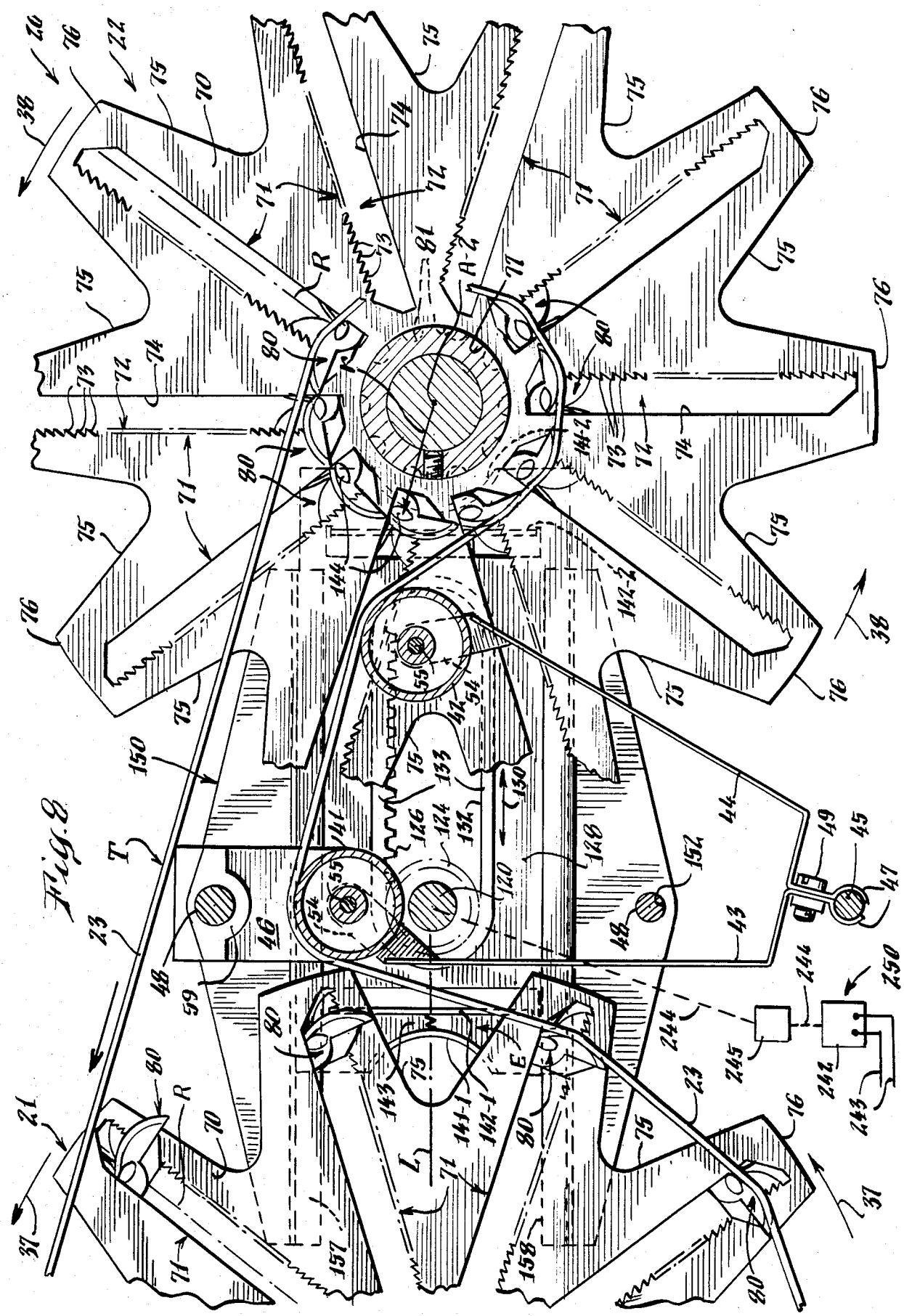
FIG. 8 is an enlarged partial sectional view of the transmission as seen from the front, this section being taken along the line 8—8 in FIG. 4. The driven pulley is seen at the right. The belt is shown in its maximum drive ratio position, namely, with the adjustable sheave elements in the driven pulley being located in their minimum diameter positions.

As seen in FIGS. 6 and 8, the idler wheels 41 and 42 are each mounted on a pivot pin 55 extending between pairs of tabs 54 which are formed on the ends of the respective wishbone arms 43 and 44.

In order to guide the belt 23 laterally, there are a pair of fixed guide shoes 46 of slippery material, for example, of injection-molded Nylon, or equivalent, straddling the U-portion of the belt. In other words, these guide shoes 46 engage the U-shaped flight of the belt in straddling relationship to the belt between the pulleys 21 and 22. This pair of spaced, parallel, opposed guide shoes 46 are seen most clearly in FIGS. 6 and 8. These guide shoes 46 have socket mounting portions 59 which are mounted on shoulders of a fixed post 48, extending across between the two main frame plates 51 and 52. This post 48 holds these frame plates in spaced, parallel relationship. A second identical post 48 is seen in FIGS. 6 and 8.

It is to be understood by the reader that these guide wheels 41 and 42 can be supplied with flanges, thereby eliminating the need for the guide shoes 46. However, as will be understood later on when the reader sees that these guide wheels 41 and 42 actually enter into driving and driven pulleys 21 and 22, using flanged guide wheels 41 and 42 would appreciably add to the overall width of the entire transmission, including increasing the width of many associated components. Thus, a very compact transmission is achieved by flangeless guide wheels 41, 42, as shown.

It is to be noted from FIG. 6 in comparison with FIG. 1, that the wishbone arms 43 and 44 as they swing back-and-forth are always clear of interference from the post 48. The frame plate 51 is secured against the shoulder on each post 48 by a machine screw 50 threaded into a socket in the end of the respective post, which has an axial boss 58. FIG. 3 shows that there are four "corner" posts at the locations 56 plus another post 57 in a symmetrical position relative to the pivot pin 45. This post 57 can be seen most clearly in FIG. 6. It is secured to each side frame plate 51, 52 by a screw 50 and an axial boss 58. Two of the posts 56 and the post 57 can also be seen in FIG. 4.

The interior of the transmission 20 is advantageously protected from entry of dirt and grit by a housing member 60 (FIGS. 3, 4, 6 and 7) which extends between the peripheries of the two side frame plates 51 and 52 and is supported by the four corner posts 56.

The structure of the adjustable, self-locking pulleys 21 and 22 and how they are assembled and mounted in the side frame plates 51 and 52 will now be described. Each of these pulleys 21 and 22 includes a pair of spaced, parallel identical disc-like members 70 (FIGS. 1, 3, 5, 7 and 8). Each disc-like member 70 has ten radial trackways 71 (FIGS. 1, 3 and 8) formed by slots. A greater or lesser number of the trackways 71 can be included in each adjustable pulley 21 and 22. In my view, ten is a very advantageous number for a wide range of practical applications. As seen clearly in FIG. 8, these trackways 71 are smooth along one side 74 and include a sequence 72 of identical saw-toothed-shaped steps 73 along the other side. Each pulley 21 and 22 includes ten identical one-piece, belt-load-locked sheave elements 80 associated with respective slots 71.

These ten identical sheave elements 80 in each pulley are injection-molded from tough, durable, stiffly-flexible plastic, for example, of Nylon filled 50% by weight with glass-fiber reinforcement or 40% by weight with carbon-fiber reinforcement. These sheave elements 80 will be described in greater detail later. They have gripping teeth which are engageable with the respective steps 73 in forty-one different adjustable radial positions. The radial spacing between the different adjustable positions of the sheave elements 80 is 0.060 of an inch. The radial spacing between the steps 73 is 0.060 of an inch.

In order to lighten the weight of each disc-like member 70 and in order to conserve material as they are cut from steel or aluminum plate, the periphery of each disc-like member has ten rounded triangular recesses 75 (FIGS. 1, 3, 8) thus forming ten tapered spoke-like radial projections 76. The ten trackways 71 extend radially outwardly into the respective projections 76.

Figure 13:
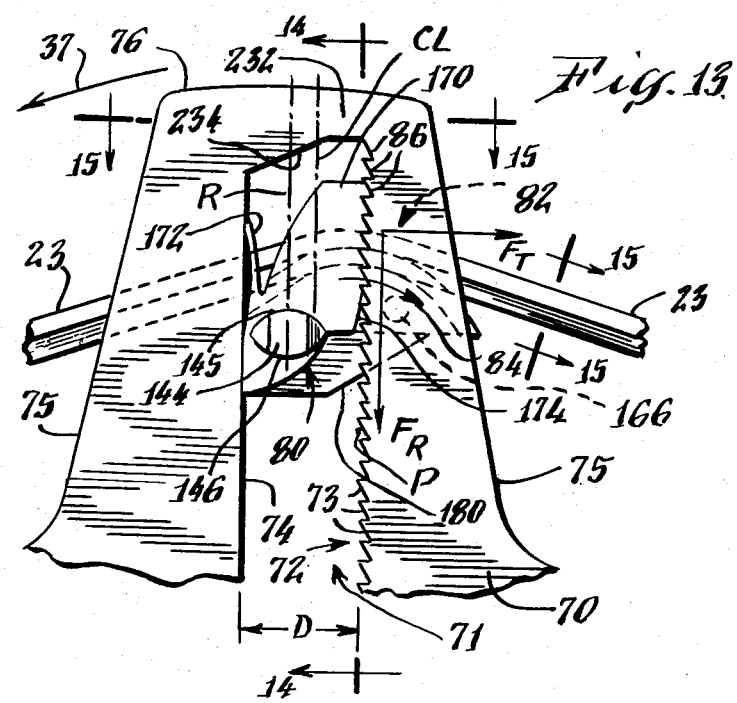
FIG. 13 illustrates one of the one-piece, belt-load-locked sheave elements engaged by the belt.

The advantageous automatic belt-load-locking action of the sheave elements will be described. This self-locking action occurs as shown in FIG. 13. The belt 23 in contact with the offset belt-engaging portion 82 of the sheave element applies torque 84 to the sheave element. This torque 84 acts in a plane perpendicular to the axis of the pulley. This torque 84 holds the saw-toothed shaped gripping teeth 86 (FIG. 17) of the sheave segment 80 in engagement at the desired position with the sequence 72 of saw-toothed shaped steps 73 in the pulley disc. The self-locking torque 84 applied to each sheave segment 80 is the result of the tangential and radial components of belt loading on the sheave segment. Thus, as illustrated in FIG. 1, the self-locking torque 84 on the sheave segments in the driving pulley 21 acts in the *opposite* sense to the direction 37 of rotation. Conversely, in the driven pulley 22 the self-locking torque 84 (FIG. 1) on the sheave segments acts in the *same* sense as the direction of rotation. Consequently, the two disc members 70 of the driven pulley 22 are reversed in orientation, i.e., they are each turned inside out, relative to the orientation of the two disc members 70 of the driving pulley 21.

The two disc-like members 70 (FIGS. 5 and 7) in each pulley have central mounting holes 77. They are secured in spaced, parallel relationship on the hollow shaft 36 by resilient, conically-bowed, axial thrust snap rings 78 which are engaged in circumferential grooves in the shaft 36 and which hold the disc member 70 against a shoulder on the enlarged central portion 79 of the shaft 36. In order to prevent the disc members 70 from turning relative to the hollow shaft 36, a multiple land-and-groove mating spline configuration 81 (FIGS. 7 and 8) is provided in the mounting hole 77 and on the portion of the shaft 36 where this mounting hole 77 is seated. The preferred ten land and ten groove configuration of this spline structure 81 can best be seen in FIG. 9.

In order to mount the respective pulley shafts 36 in the main frame plates 51 and 52, there are pairs of commercially available ball-bearing units 88 including snap rings 89 engaging in a groove in the outer race of the ball bearing unit. The ball bearing units 88 fit into holes 90 in the frame plates 51, 52. These snap rings 89 abut outwardly against rabbeted seats in the respective frame plates 51 and 52. The inner race of each ball bearing unit 88 thrusts axially inwardly against a shoulder 92 (FIGS. 5 and 7) on the shaft 36 at the outer end of the respective spline region 81 thereby locating the rotatable shaft 36.

The manner in which the drive ratio is adjusted will now be explained.

There is a manually adjustable control knob 100 (FIGS. 3, 4, 5 and 6) with a position indicator scale 102 (FIG. 6) on its circumference reading in forty-one uniformly spaced position numbers: 01, 02, 03, 04, 05 ... 38, 39, 40, 41. This control knob 100 also includes forty uniformly spaced detent notches or indentations 104 on its circumference. Each of these detent notches 104 corresponds to a respective one of the shifter position numbers, except that the first and last position numbers 01 and 41 are aligned with the same detent notch, and they are actually written with an appearance 01/41. Therefore, in turning the control knob 100 from the first numbered position 01 to the last position 41, the knob is turned one complete revolution back to its initial position. A reading pointer 106 (FIG. 6) on the edge of a front scale plate 108 is used to read the indicator scale 102.

This front scale plate 108 in the rectangular area 110 (FIG. 3) carries a listing of data (not shown) informing the user of the drive ratios corresponding to each of the forty-one indicated shifter position numbers. In other words, the data drive ratio versus shifter position number on this front scale area 110 corresponds with the data which is plotted in FIG. 2. As seen most clearly in FIG. 6, the front scale plate 108 is mounted by machine screws 50 on the front ends of the two posts 48. The control knob 100 is located between this scale plate 108 and the frame plate 52.

The control knob 100 is keyed onto the front end of a rotatable pinion gear shaft 120 (FIGS. 5 and 6) which is journaled in self-lubricating bearing sleeves 122 located in holes in the frame plates 51 and 52.

On the pinion gear shaft 120 there are two axially spaced identical pinion gears 124 (FIGS. 5 and 6) respectively adjacent to the inner surfaces of the two frame plates 51 and 52. Each pinion gear engages a straight gear rack 126 (FIGS. 5, 6, 8) on a movable shift cam member 128 (FIGS. 8 and 18) for moving this member 128 back and forth as shown by the double arrow 130 (FIGS. 5 and 8) for shifting the drive ratio. There are two identical such shift cam members 128 located respectively adjacent to the inner surfaces of the respective frame plates 51 and 52. The two shift cam members 128 are moved simultaneously and equally by rotation of the two pinion gears 124 by manually turning the control knob 100.

In other words, as seen most clearly in FIGS. 5 and 6, the two shift cam members 128 are mechanically ganged together through the agency of the two pinion gears 124 on a common shaft 120. Thus, the positions of these two shift cam members 128 are simultaneously equally shifted by turning the control knob 100 which is keyed to the front end of this pinion shaft 120.

In order to assure good engagement with their respective pinion gears 124, as seen in FIG. 6, the shift cam members 128 are stamped or formed for offsetting the margin 133 (FIGS. 5 and 6) of an elongated opening 132, including the region of the rack 126, from the plane of the remainder of the shift cam member 128. This offset margin 133 of the opening 132 serves as a stiffening rib for the shift cam member 128 as a whole.

Figure 18:
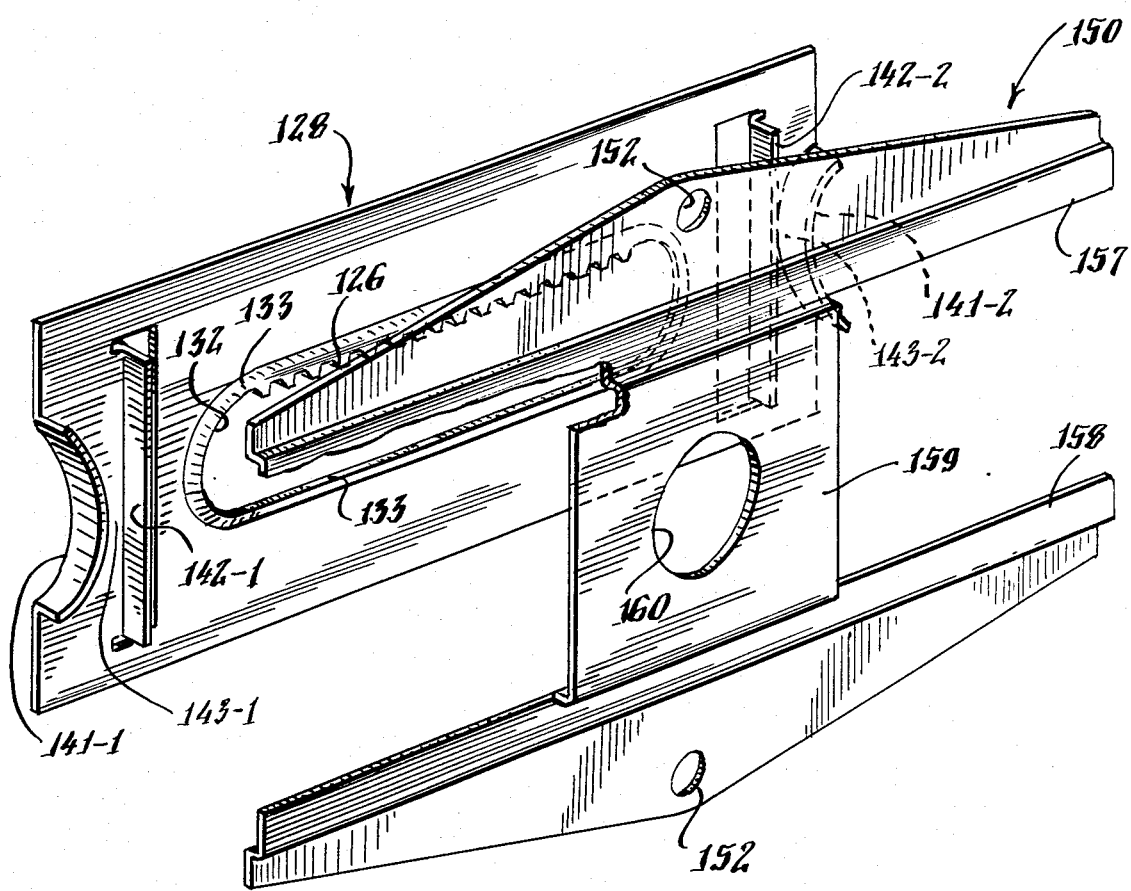
FIG. 18 is a perspective view of one of the two fixed guides and one of the two movable shift cam members, which may also be called a movable shift plate. This movable shift plate is guided by the fixed guide. They are shown spaced apart for clarity of illustration.

Inviting attention to FIGS 8 and 18 it is seen that each shift cam member 128 has an overall elongated rectangular configuration and is movable back and forth lengthwise as shown by the double arrow 130 (See also FIG. 5). The elongated opening 132 is seen in FIG. 8 as having two straight sides and two semicircular curved ends (like a racetrack). This opening 132 extends lengthwise in each shift cam member 128. The rack 126 extends along the interior of one of the offset straight margin regions 133 of the elongated opening 132. This elongated opening 132 provides clearance for the shift cam member 128 to move back and forth as shown by the double arrow 130 without interference from the pinion or its shaft 124, 120. When the shift cam member 128 travels to the end of its stroke 130 in either direction, a semi-circular curved end of the elongated opening 132 bumps against the associated pinion gear 124 as a travel limit stop. FIGS. 5 and 8 show the shift cam members 128 shifted to their extreme right positions, i.e. to their last positions (shifter indicator number 41) for providing the maximum drive ratio.

In order to shift the drive ratio, by shifting the sheave segments 80, each shift cam member 128 has two pairs of shift cams. There is an inner shift cam 141-1 (FIGS. 5, 8) for the drive pulley 21, and nearby there is an outer shift cam 142-1 for the drive pulley. The inner and outer shift cams 141-1, 141-2 for the drive pulley 21 are both located on the left end of the member 128. This inner shift cam 141-1 as seen in FIG. 8 has a predetermined maximum permissible arcuate shape, as is determined by the transmission geometry to be explained later. The outer shift cam 142-1 is shown as straight. At the right end of each shift cam member 128, there is a second pair of shift cams, namely, inner shift cam 141-2 and outer shift cam 142-2 both for the driven pulley 22. This second pair of shift cams 141-2 and 142-2 are shaped as mirror images of the first pair 141-1 and 142-1.

These two pairs of shift cams 141-1, 142-1 and 141-2, 142-2 are symmetrical and fabricated by stamping or forming the metal (preferably steel) of the member 128 at right angles to its plane, thereby providing four respective channels 143-1 and 143-2 (best seen in FIG. 5) between these respective pairs of shift cams. These shift cams act upon streamlined trunnion-like projections 144 (FIGS. 13, 14, 15, 16) located on opposite sides of each sheave segment 80. These projections 144 extend out beyond the radial trackway slots 71. In other words, these projections 144 extend out beyond the outer surfaces of the disc members 70 where they can be engaged by the respective inner and outer shift cams 141, 142.

It is to be noted that these inner and outer shift cams 141, 142 are engageable with the trunnion-like projections 144 only when the sheave segments 80 are unloaded, i.e. not in contact with the belt 23. In other words, as seen from a consideration of the belt geometry in FIGS. 1, 3 and 8, the "wrap" of the belt 23 around each pulley 21 and 22 is at least 230°. However, there is a relatively small angular sector S-1 or S-2 (FIG. 1) on the side of each pulley 21 and 22 where the belt 23 is not in contact with sheave segments 80. This angular sector S-1 and S-2 of unloaded sheave segments intersects the straight center line L (FIG. 1) joining the axis A-1 of the driving pulley with the axis A-2 of the driven pulley. The shift cams 141, 142 are engageable with the projections 144 on the sheave segments 80 only in the sectors S-1 and S-2 where the sheave segments 80 are unloaded.

In order to guide each of the two movable shift cam members 128 as they are moved back and forth in their stroke 130 there are two corresponding guides 150. These guides 150 (See also FIG. 18) have a wide-flange I configuration as seen in front elevation in FIGS. 3 and 8. These two guides 150 (FIG. 6) are mounted adjacent to the inner surfaces of the frame plates 1 and 52. These two guides are secured in position by the posts 48 (FIG. 6) and their axial bosses 58 which fit through holes 152 in these guides. Shoulders 154 on the posts 48 clamp the guides 150 against the respective frame plates 51 and 52. These shoulders 154 also engage the socket mounting portions 59 of the guide shoes 46, as described earlier.

The two guides 150 each have an upper and lower offset guide flanges 157, 158. These offset guide flanges 157, 158 are in spaced parallel relationship in the respective guide 150. These flanges 157 and 158 overlap (FIG. 6) the upper and lower edges 155, 156, respectively, of the respective shift cam member 128 in close fitting but freely sliding relationship.

As described above, each guide 150 has a wide flange I configuration. The central vertical stem portion 159 (FIG. 6) of this I configuration is offset farther (FIG. 6)

than the flanges 157, 158 for clearing the offset margins 133 of the shift cam member 128. Also, this vertical stem portion 159 of each guide 150 has a hole 160 providing clearance for the pinion 124.

Inviting attention to FIGS. 13 through 17, there are shown the advantageous features of each one-piece, belt-load-locked sheave segment 80. The belt-engaging portion 82 is convex radially outward as seen in FIG. 13. This portion 82 has a radius of curvature less than the minimum adjusted pulley diameter as will be seen from the sheave segments 80 in the driven pulley 22 in FIG. 8. Therefore, the belt 23 always tangentially approaches and recedes from each belt-engaging portion 82. In other words, the belt-engaging portion 82 can never "stub its toes" so-to-speak on the belt in any of the adjusted positions of the sheave segments. Also, this belt-engaging portion 82 has a radius of curvature which is more than the minimum pulley radius recommended by the manufacturer of the belt 23.

This convex belt-engaging portion 82 has a multiple-v configuration (four grooves) with a 40° included angle (FIG. 16) in each groove 162 for gripping the v-ribs on the belt 23 with a strong frictional grip. The reinforcing cords in the belt are shown at 164. On the opposite axial faces of the belt-engaging portion 82 are a pair of small rounded bearing humps 166 slidably engaging the inner surfaces of each pulley disc member 70 near the trackway slot 71.

As explained earlier, the belt-engaging portion 82 is offset from the centerline of the radial trackway slot 71. Consequently, the belt load applies a torque 84 for forcing and holding the gripping teeth 86 of the sheave segment into engagement with the saw-tooth steps 73 along the edge of the slot. The belt load applies two components of force onto the belt-engaging portion 82. One component is a tangential force in the direction $F_T$ (FIG. 13) caused by the pull of the belt, which is greater in the opposite direction from the arrow 37 for the driving pulley 21 and which is greater in the same direction as the arrow 38 (FIGS. 1, 3 and 8) for the driven pulley 22. The other component of force is a radial force $F_R$ (FIG. 13) caused by the inward pull of the belt "wrap". It is to be understood that if the teeth 86 were not gripping the steps 73, then the radial force $F_R$ would cause the sheave segments 80 all to slide inward to the minimum pulley diameter, thereby allowing the pulley to "collapse" to its smallest diameter. Thus, advantageously, the self-locking action of the torque 84 serves to hold the adjusted position of each sheave segment 80 and to resist the collapsing force $F_R$.

The gripping teeth 86 are located on a pair of upstanding parallel wing-like ears 170 which straddle the belt-engaging portion 82. These gripping teeth extend along the "forward" edge of each wing-like ear 170. These wing-like ears 170 extend radially outwardly in the trackway slot 71.

As used herein, the term "forward" means the edge of each wing-like ear toward which the torque 84 is acting, i.e. the direction toward which the dominant belt pulley force $F_T$ is acting. The term "rear" or "rearward" means the opposite direction.

As used herein, the term "top" means oriented in a radially outward position or direction relative to the axis A-1 or A-2 of pulley rotation. Conversely, the term "bottom" means oriented in a radially inward position or direction.

A resilient spring finger 172 extends from the "rear" edge of each wing-like ear 170. This resilient spring finger 172 presses "rearward" in sliding relationship against the smooth side 74 of the trackway slot 71 for resiliently urging the gripping teeth 86 "forward" into engagement with the steps 73 for resisting inadvertent dislodgement of the sheave segments 80 by centrifugal action during movement along their unloaded sectors S-1 or S-2 (FIG. 1) as the pulleys rotate.

The trunnion projections 144 extend out from the axial sides of the wing-like ear projections 170 near their "bottom" end. These projections 144 are located nearer the smooth side 74 of the trackway slot 71 than they are to the sequence 72 of saw-tooth steps 73. These projections 144 are centered on a radial line R passing through the axis A-1 or A-2 (FIG. 1) Line R extends parallel to the edges 74 and 72 of the trackway slot 71. In other words, each trackway slot 71 is offset in a "forward" direction relative to a radial line R, as seen from the radial line R in FIG. 13. Two-thirds of the total width of the trackway slot 71 is forward of the radial line R. Such a radial line R is also shown in one of the slots 71 in FIG. 8. By virtue of this "forward" positioning of the major portion of the total width of each slot 71, and by virtue of the fact that the "bottom" of each slot 71 slopes downwardly in the "rearward" direction, the ten sheave segments 80 can be adjusted to their innermost possible positions in which they all repose snugly adjacent each other, toe-to-heel, toe-to-heel, etc. extending around the pulley axis A-2 without mechanical interference among each other. Also, this sloping configuration of the "bottom" of each slot 71 maintains significant amounts of metal between the inner ends of these slots for maintaining strength in the pulley disc members 71 while also maximizing the overall range of adjustable drive ratios for the given overall diameter of the pulley disc members 70. In other words, a relatively large range in drive ratios of 7.38 to 1 is achieved in a compact, thin transmission with two relatively compact pulleys whose disc members 70 have overall diameters of only 8.13 of an inch.

In order to facilitate the radial shifting of the sheave segments 80 by the shift cams 141, 142, the "bottom" portion of the "forward" edge 173 of each wing-like ear 170 is rounded rearwardly (FIG. 17) by a small amount from the line of the forward edge 173, to form a ramp or lead surface 174. Also, the "forward" tips of a plurality of the "bottom" gripping teeth 86 are truncated for facilitating the radial shifting. The line 175 of truncation extends at a small angle C to the "forward" edge 173, for example, at an angle of 3.25°. The series of three flattened tips resulting from this truncation are shown at 176, 177, 178.

Figure 15:
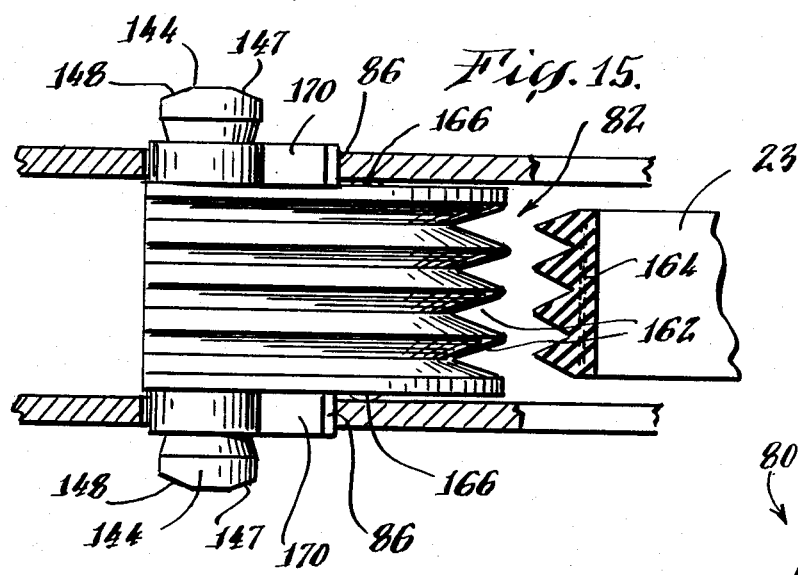
FIG. 15 is an enlarged view of the sheave element as seen from the position 15—15 in FIG. 13, showing its multiple-v shaped belt-engaging surface and also showing a cross-sectional view of the belt.
Figure 16:
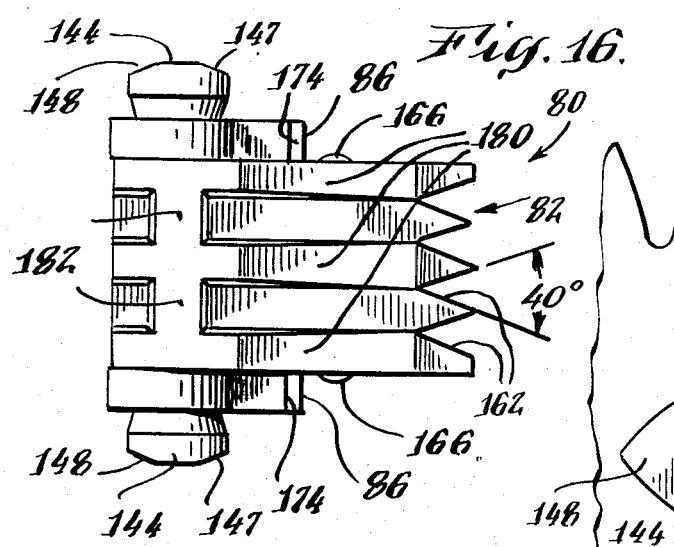
FIG. 16 is an enlarged bottom view of the sheave element as seen from the position 16—16 in FIG. 14.

The trunnion projections 144 are streamlined as seen in the axial direction in FIG. 13, having smoothly curved "top" and "bottom" surfaces 145, 146, respectively. The "forward" and "rearward" portions 147, 148, respectively, of the outer ends of the trunnion projection 144 are chamfered slightly as seen in FIGS. 15 and 16 for streamline effect. Therefore, these trunnion projections 144 will slide smoothly through the channels 143-1, 143-2 between the respective pairs of shift cams 141-1, 142-1 and 141-2 and 142-2.

When the sheave segments 80 are already in the desired positions, then as the pulleys 21 and 22 rotate, the trunnion projections 144 of the "unloaded" (not-in-contact-with-the-belt) sheave segments 80 pass freely through these channels 143-1 and 143-2 without contact of the streamlined projections 144 with either the inner or outer shift cam. From the geometry of FIG. 1, it will be understood that the regions where the projections 144 pass through the channels 143 are near the straight line L between the pulley axes A-1 and A-2.

Previously, it was explained that the transmission geometry determines the maximum possible arcuate shape of the inner shift cams 141-1 and 141-2. Now it will be understood from a consideration of FIGS. 5 and 8 that these inner shift cams 141-1 and 141-2 must have a radius of curvature less than the smallest radius "r" (FIG. 8) of the path of travel of the revolving trunnion projections 144 when the sheave segments 80 are adjusted to their innermost positions, as seen in FIG. 8. The radius of the inner shift cams 141-1 and 141-2 must be sufficiently small relative to the minimum radius "r" for defining a funnel-like entry, as shown at "E" (FIG. 8) between the inner and outer shift cams. This funnel-like entry E leads into the narrowest region "N" (FIG. 8) between the inner and outer shift cams. This narrowest region "N" is the throat of the channel 143 and occurs on the straight line L passing through the pulley axes A-1 and A-2.

In operation, as explained above, when the sheave segments 80 are already in their desired positions, then, as the transmission is running, the pulleys rotate, and the streamlined trunnion projections 144 of the unloaded sheave segments 80 pass freely through the narrow throat "N" (FIG. 8) of the channel 143 between the inner and outer shift cams 141 and 142 without contact occurring between the streamlined projections 144 and these shift cams.

In operation, as the transmission is running, the pulleys are rotating and the user may change the drive ratio by turning the control knob 100 to a different position. Turning the control knob 100 causes the pinions 124 acting on the gear racks 126 to move both of the symmetrical cam members 128 simultaneously toward one pulley axis A-1 or A-2 and simultaneously the same amount away from the other pulley axis A-2 or A-1. These cam members 128, which may be called "shift plates", thereby produce simultaneous and equal shifting in the positions of all of the pairs of inner and outer shift cams 141, 142. Consequently, the narrow throat regions N (FIG. 8) of the channels 143 between these pairs of inner and outer shift cams have now been shifted to different positions along the line L. The pulleys are rotating, and the stream-lined trunnion projections 144 of the unloaded sheave segments 80 engage the respective inner or outer shift cam 141 or 142 in the funnel entrance E and become shifted to a new radial position. The drive ratio can be shifted quite rapidly by turning the control knob. The faster the transmission is running, the faster that the drive ratios can be shifted. The only limitation in the rate at which the user can shift drive ratios is that the cam members (shift plates) 128 cannot be shifted so rapidly relative to the rate of pulley rotation that the trunnion projections 144 will fail to enter the funnel entry E (FIG. 8). If the trunnion projections 144 are caused to miss the funnel entry E by an unduly sudden rate of shifting of the cam members (shift plates) 128 relative to pulley rotation, then mechanical jamming could occur. As will be explained further below, an automatic safety interlock prevents any such inadvertent attempts to shift the transmission too suddenly when the transmission is running too slowly.

Figure 17:
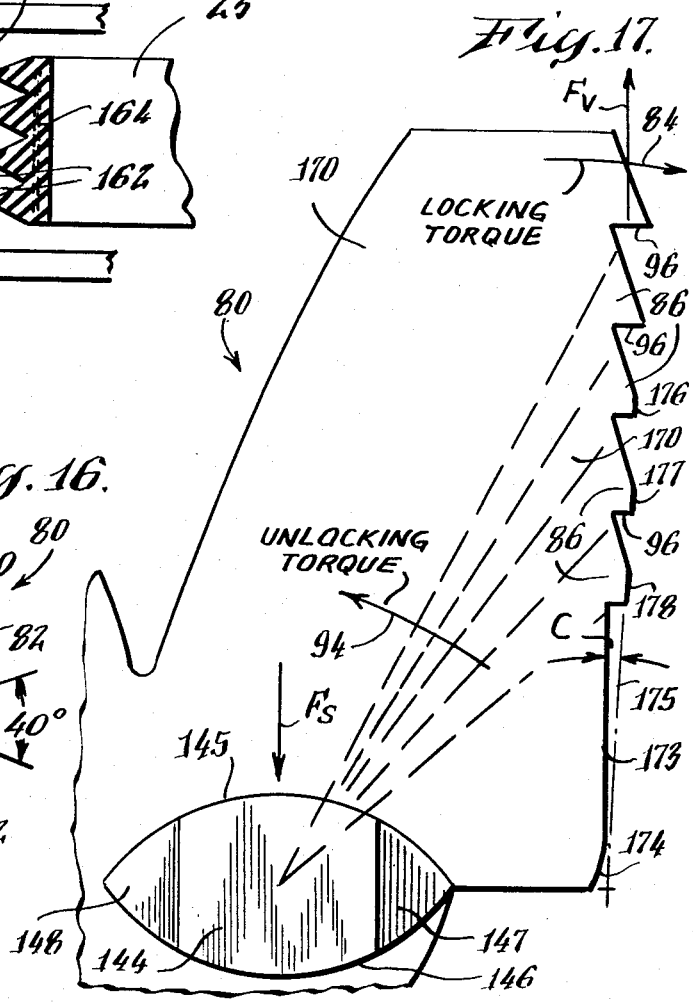
FIG. 17 is a greatly enlarged view of the saw-tooth-shaped gripping teeth on the sheave element.

Inviting attention to FIGS. 13 and 17, in operation, when the two inner shift cams 141 engage the respective curved surfaces 146 of the two streamlined trunnion projections 144 of an unloaded sheave segment 80, the outward radial force exerted by the inner shift cam on each curved surface 146 causes the gripping teeth 86 to ride outwardly over the saw tooth steps 73. The resilient spring finger 172 flexes to allow the gripping teeth 86 to ride over the saw-tooth steps 73 with gentle clicking noises like small pawls riding over small ratchet teeth. It is to be understood that as the sheave segment 80 is moved radially outwardly, it turns a slight amount in the opposite sense from the torque arrow 84 as the gripping teeth 86 ride up over the tip of each successive saw-tooth step 73. In other words, the sheave segment 80 turns slightly counterclockwise as the gripping teeth 86 ride over each saw-tooth step 73. The amount of this counterclockwise turning of the sheave segment 80 is approximately equal to the angle "C" of truncation 175 in FIG. 17. Therefore, this line of truncation 175 facilitates the outward shifting of each sheave segment without unduly diminishing the self-locking action of these teeth 86 when the sheave segment is loaded by contact with the belt.

In operation, when the two outer shift cams 142 engage the respective curved surfaces 145 of the two streamlined trunnion projections 144 of an unloaded sheave segment 80, the radial inward shifting force $F_s$ (FIG. 17) exerted by the outer shift cams on curved surfaces 145 again causes the sheave segment to turn a slight amount in the opposite sense from the torque arrow 84. In other words, outer shift cam force $F_s$ exerted on the surfaces 145 causes the sheave segment 80 to turn counterclockwise by an amount approximately equal to the angle "C" in FIG. 17. By turning through this angle C, all of the gripping teeth 86 clear the saw-tooth steps 73 allowing the unloaded sheave segment to be slid radially inwardly.

The fact that the trunnion projection 144 is on the radial line R (FIG. 13) which is spaced further from the steps 73 than from the smooth edge 74 creates an effective counterclockwise unlocking torque 94 (FIG. 17) on the unloaded sheave segment 80, thereby turning it counterclockwise through the angle C. The center line "CL" of the slot 71 is shown in FIG. 13. The center of the trunnion projection 144 is located on the opposite side of this center line CL from the steps 73. This is another way of expressing the fact that the trunnion projection 144 is spaced further from the steps 73 than from the smooth edge 74 for providing unlocking torque 94, as explained next.

The manner in which the unlocking torque 94 is created will be explained in connection with FIG. 17. The two outer shift cams 142 are exerting an inward shifting force $F_s$ on the rounded surface 145 of the two relative trunnion projections 144. Consequently, the flat gripping surfaces 96 of the gripping teeth 86 are caused by the forces $F_s$ to press against the steps 73. These flat gripping surfaces 96 extend perpendicular to the radial line R (FIG. 13) passing through the center of the trunnion projection 144. Conversely, the steps 73 are pressing outwardly against these flat surfaces 96 as indicated by the arrow $F_v$. The two forces $F_s$ and $F_v$ acting on the sheave element 80 are a couple, thereby creating the counterclockwise unlocking torque 94 which causes the sheave element to turn through the angle C for causing the teeth 86 to withdraw from engagement with the steps 73 for allowing the sheave element 80 to be shifted inwardly to form a pulley of reduced radius.

The line of truncation 175 facilitates the inward shifting of each sheave segment 80 without unduly diminishing the self-locking action of the teeth 86. When the trunnion surface 145 is no longer in contact with an outer shift cam, the resilient finger 172 rotates the sheave segment clockwise through the angle C causing the gripping teeth 86 again to engage the saw-tooth steps 73 in the shifted position.

Figure 14:
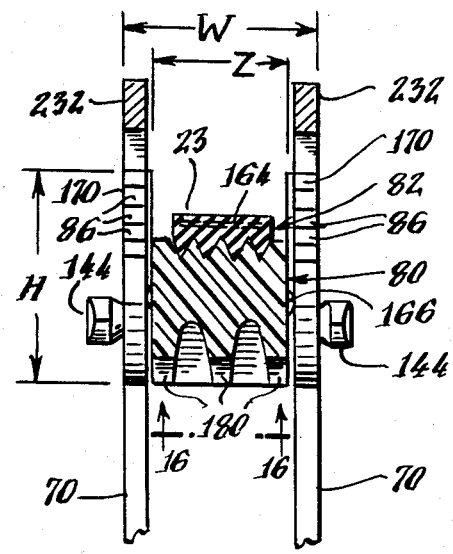
FIG. 14 is a section taken along the line 14—14 in FIG. 13.

In order to strengthen and lighten the sheave segment 80, its "bottom" surface, as seen in FIGS. 14 and 16, is formed with three longitudinal ribs 180 and a transverse rib 182.

In the presently preferred embodiment, each sheave segment 80 has a width "W" (FIG. 14) between the outer surfaces of the two wing-like ears 17 of 0.628 of an inch. The outer surfaces of the two pulley disc members 70 are spaced apart approximately this same width W. The inner surfaces of the wing-like ears 170 are spaced apart by a distance "Z" (FIG. 14) of approximately 0.42 of an inch. The height "H" (FIG. 14) of the wing-like ears 170 from "bottom" to "top" is 0.660 of an inch. The forward-to-rear dimension "D" (FIG. 13) of the wing-like ear 170 is 0.380 of an inch. The trackway slot 71 has a width "D" approximately equal to 0.380 of an inch measured from the smooth edge surface 74 to the tips of the steps 73. The belt-engaging portion 82 has a radius of curvature of 0.438 of an inch as measured to the tops (crests) of the ribs between v-notches 162. The radial depth of these v-notches 162 is 3/32nds of an inch. The tops of the wing-like ears 170, as seen in FIG. 14, are higher than the crests of the ribs between the v-notches 162 by a difference of approximately ¼ of an inch. The point "P", which is the center of the convex arc of the belt-engaging portion 82 is located in alignment with the forward arrowhead D, namely, the forward edge of the wing-like ear 170, thus being offset in a forward direction by a distance of one-quarter of an inch from the radial line R passing through the center of the trunnion projection 144. The belt 23 has an overall width of ⅜ths of an inch.

In order to prevent the user from attempting to shift drive ratios when the transmission is stationary or not revolving faster than a predetermined minimum speed, for preventing jamming or damage, there is an automatic centrifugal-action-actuated safety interclock mechanism 190 as shown in FIGS. 3, 5, and 9 through 12.

There is a movable detent element 191 (FIG. 5) engaging with the notches 104 in the perimeter of the knob 100. This detent element 191 fits through a keyhole-shaped opening 192 (FIG. 3) in a latch bar 193. This latch bar is movable back and forth (double arrow 194) along the line L passing through the pulley axes A1 and A-2. A tension spring 195 (FIG. 5) mounted on an anchoring stud 196 and hooked into a hole 197 in the end of the latch bar 193 urges the latch bar toward the control knob 100, thereby causing the detent 191 to click into the respective notches 104 as the knob is turned. Thus, the user seeks one of the numbered positions 01 to 41; the knob does not detent at an intermediate position.

Consequently, the adjusted detented positions of the throat region "N" (FIG. 8) defined between the shift cams 141, 142 always correspond exactly with the 41 positions with which the gripping teeth 86 can engage in self-locking relation with the saw-tooth steps 73 in the pulleys. This exact one-to-one synchronous relationship between control knob positions and adjusted radial positions is in sharp contrast to the non-synchronous conflict relationship between the continuously adjustable control and serrated slots in my prior patent as previously discussed.

These 41 positions are radially spaced 0.060 of an inch as explained above. In other words, turning the knob 100 one detent "click" from one numbered position to the next causes "N" (FIG. 8) to shift by a distance of 0.060 of an inch along the line L.

When the driving pulley 21 is stationary or is rotating slower than a predetermined minimum safe shifting speed, then a spring 198 (FIG. 12) automatically pushes a locking bolt 199 into a hole 200 in the latch bar 193. The detent 191 is thereby locked in a notch 104, and the user is prevented from inadvertently turning the knob 100.

When the driving pulley 21 is rotating faster than the minimum safe shifting speed, then a pair of centrifugal-action "flyball" masses 201, 202 (FIG. 12) are each tilted outwardly away from the axis of rotation A-1. These flyball masses 201, 202 are advantageously compactly located in the bore of the hollow shaft 36-1. Each has an L-shape as seen in FIG. 5. When the masses 201, 202 are tilted out from the axis A-1, they overcome the force of the spring 198 for retracting the bolt 199 from the hole 200, thereby automatically freeing the control knob 100 to be adjusted by the user, if desired.

The L-shaped "flyball" masses 201, 202 have toes 203, 204, respectively, engaging in recesses 205, 206, respectively, on opposite sides of the bolt 199. The centrifugal outward tilting of the masses 201, 202 swings their toes 203, 204 in the axial direction 207 (FIG. 5) for retraction of the bolt 199. The L-shaped masses 201, 202 have rounded heel pivot regions 223, 224 nesting in opposed peripheral pivot seats 209, 210 in the rim 208 of a governor housing 211. This housing 211 has a turret 215 containing an axial bore 212 for receiving the spring 198 and the round shank 213 of the bolt 199.

Adjacent to the bore 212 is a square socket 216 in the turret 215 for receiving the square shank 214 containing the recesses 205 and 206. The housing turret 215 contains opposed ports 217, 218 for providing access for the toes 203, 204, respectively, to be inserted into the recesses 205, 206 in the square shank 214. The rim 208 of the governor housing 211 is received into a counter bore 220 in the end of the hollow shaft 36-1.

The latching bar 193 has an elongated opening 221 for being guided by the end of the anchor stud 196 (FIG. 5). A larger elongated opening 222 (FIG. 5) at the other end of the latching bar is guided by the forward end of the pinion shaft 120.

The outer surfaces 225, 226 of masses 201, 202 are conically tapered for providing clearance spaces 227, 228 for these masses 201, 202 to tilt outwardly (arrows 229, 230). FIGS. 9 and 10 show the masses 201, 202 in their inner positions to which they are urged by the spring 198 when the pulley shaft 36-1 is stationary or turning too slowly for safe shifting of the drive ratio.

Inviting attention back to FIGS. 13 and 14, it is seen that a bridging portion 232 of the disc member 70 at the outer end of each spoke-like projection 76 closes the outer end of each trackway slot 71. This bridge 232 blocks the outer end of the trackway slot 71, serving to capture the wing-like ear 170 of the sheave segment 80. Thus, the sheave segments 80 are captivated and cannot escape from the trackway slots 71 of the assembled pulleys. This bridge 232 is sloped at 234 for providing clearance for the outer end of the wing-like ear 170 to reach the outermost end of the sequence 72 of sawtooth steps 73.

The flangeless belt-guidance idler rollers 41, 42 which cause the belt 23 to "wrap" around each pulley 21, 22 advantageously swing back and forth as discussed above, as shown in FIG. 1 at 41, 41', 41" and 42, 42', 42". These idler rollers 41, 42 advantageously can enter deeply (without mechanical interference) into the interior of each pulley 21, 22 in the interior space between the pair of spaced disc-like flange members 70 of the respective pulley, and these idler rollers can move freely (as seen in FIG. 6) between the pair of slippery belt-guide shoes 46. Consequently, these swinging idler rollers achieve a relatively great "wrap" of at least 230° around each pulley even at the very maximum and minimum drive ratios. A study of the geometry of FIG. 1 will show the reader that the "wrap" of the belt is always greater around the particular pulley which happens to have the larger adjusted diameter. The "wrap" around a pulley at maximum diameter approaches 270°.

As discussed in the introduction, the friction grip multiplication achieved by such angular wrap is calculated by the formula set forth. The present novel great "wrap" of at least 230° advantageously provides a relatively great friction grip multiplication, as explained in the introduction. Therefore, the tension applied by the belt guidance and tensioning means 40 (FIG. 1) can be minimal, thereby enabling lightweight, inexpensive structure to be used while also advantageously minimizing tension on the belt 23 while it is flexed inside out in the U-shaped portion of its travel. Consequently, the friction drag caused by idlers 41, 42 is minimal, and an extremely high overall mechanical efficiency is achieved in this compact transmission when operating under full load.

The elastomeric material of the belt 23 advantageously inherently exerts a strong frictional grip on the v-notches 162 (FIG. 16) of the reinforced plastic sheave elements. Such a large coefficient of friction is not obtainable between the elastomeric material of the belt and aluminum or zinc. The elastomeric material inherently exerts a strong friction grip on the reinforced plastic material. In addition for enhancing this friction grip, the surface of the injection mold is roughened in sand-blasting manner for inexpensively providing a fine-sandpaper-like roughened surface on the v-notches 162 for achieving an enhanced coefficient of friction between the belt 23 and each reinforced plastic sheave segment.

The preferred injection-molded 50% glass-fiber reinforced Nylon plastic material has a specific gravity less than one-sixth that of zinc, thereby advantageously minimizing centrifugal force as compared with such metal. Furthermore, this preferred reinforced Nylon material offers the other advantages discussed in the introduction. It has an adequate compressive strength. It has a Young's modulus of elasticity of less than 2,000,000 pounds per square inch, enormously lower than zinc, for providing an appropriate modest resilient spring force in the integrally molded curved spring finger 172 (FIG. 13). This desired moderate resiliency enables the gripping teeth 86 to ride over the steps 73 by applying only a moderate radially directed shifting force to the projections 144.

The disc-like members 70 are preferred to be made from high strength aluminum alloy, for example, such as 6061-T6 aluminum alloy, and are preferably coated with a solid film lubricant, such as polytetrafluroethylene (PTFE).

By virtue of the fact that the shifter control shaft 120 (FIG. 8) is turned through equal increments, for example, of 9° each for one complete revolution in order to obtain the 41 uniformly graduated steps of the drive ratios 240 (upper curve, FIG. 2) or 240' (lower curve), an automatic shift drive 250 may advantageously be applied as shown in FIG. 8. For example, this automatic shift drive 250 comprises a stepper motor 242 controlled by electrical signals transmitted over the electrical lines 243. This stepper motor 242 is mechanically coupled to the control shaft 120 by a mechanical coupling indicated by the dashed line 244, for example, such as by a direct shaft-to-shaft coupling. If the stepper motor 242 operates in increments of exactly 9°, then a direct one-to-one mechanical shaft connection 244 may be used. If the stepper motor 242 operates in increments other than 9°, then a gear box 245 is included in the mechanical connection 244 in order to convert the particular angular increments available from the stepper motor into 9° increments applied to the control shaft 120. Therefore, this transmission can readily be controlled from a remote location, if desired.

While the novel features of the invention have been illustrated and described in connection with a specific embodiment of the invention, it is believed that this embodiment will enable others skilled in the art to apply the principles of the invention in forms departing from the exemplary embodiment herein, and such departures are contemplated by the claims.

I claim:

1. An adjustable drive ratio multiple-step belt transmission comprising:
   at least one pulley rotatable about an axis including a plurality of trackways each extending from respective inner positions nearer to the axis to respective outer positions farther from the axis,
   a plurality of steps extending along in a sequence parallel to each respective trackway,
   a plurality of belt-load-locking sheave segments adjustable in position along the respective trackways,
   each sheave segment including gripping tooth means for engaging said sequence of steps for holding the sheave segment in its adjusted position,
   each sheave segment including a belt-engaging portion offset from the centerline of said trackway in the circumferential direction toward which the dominant belt tension pulls when the transmission is running for causing belt loading on said offset belt-engaging portion of the sheave segment to exert torque in a predetermined direction on the sheave segment when the sheave segment is under belt loading,
   said gripping tooth means being located on said sheave segment in a position for being urged in a predetermined direction by said torque resulting from said belt loading,
   said sequence of steps being located on the side of the trackway toward which said torque urges said gripping tooth means, and
   shift means engageable with the respective sheave segments when unloaded by the belt for shifting the unloaded sheave segments along the trackways for changing the effective diameter of the pulley for changing the drive ratio.

2. An adjustable drive ratio multiple-step transmission as claimed in claim 1, in which:

said sequence of steps extending along each trackway is located on the side of each trackway toward which the dominant belt tension pulls when the transmission is running, and said steps are saw-tooth shaped having abrupt step-like surfaces facing radially outwardly and having sloping surfaces facing radially inwardly.

3. An adjustable drive ratio multiple-step transmission as claimed in claim 2, in which:

said belt-engaging portion of each sheave segment is curved convex radially outwardly, the sequence of steps are offset from the centerline of the trackway in the circumferential direction toward which the dominant belt tension pulls when the transmission is running, and the center of curvature of said curved convex belt-engaging portion of the sheave segment is offset from the centerline of the trackway at least as far as the sequence of steps are offset for applying a strong torque in said predetermined direction for strongly urging said gripping tooth means into holding engagement with said sequence of steps when the sheave segment is under belt loading.

4. An adjustable drive ratio multiple-step belt transmission as claimed in claim 1, in which:

said shift means simultaenously equally engage opposite axial side regions of each unloaded sheave segment during shifting thereof for exerting balanced equal radially-directed shifting forces on opposite axial sides of the unloaded sheave segments during shifting thereof.

5. An adjustable drive ratio multiple-step belt transmission as claimed in claim 1, in which:

said sheave segments each include a pair of projections on opposite sides thereof extending in opposite axial directions, said pair of projections on each sheave segment are in axial alignment, and said shift means simultaneously equally engage said projections on each unloaded sheave segment during shifting for exerting balanced, equal radially-directed shifting forces on opposite axial sides of the unloaded sheave segments during shifting thereof.

6. An adjustable drive ratio multiple-step belt transmission as claimed in claim 5, in which:

said pair of projections on each sheave segment are offset from the centerline of the trackway in the opposite direction from said belt-engaging portion for causing the engagement of said shift means with said projections on the respective unloaded sheave segments during shifting inwardly toward the inner end of the trackway to apply torque in the opposite direction from that caused by belt loading for disengaging the respective gripping tooth means of the sheave segments from the steps during inward shifting.

7. An adjustable drive ratio multiple-step belt transmission as claimed in claim 1, in which:

an element extends along each trackway uniformly spaced from the sequence of steps extending along the trackway, and each sheave segment includes spring means exerting force against said element for urging the gripping tooth means of the sheave segment toward said sequence of steps for resisting dislodgement of the sheave segment from its adjusted position by centrifugal action of the rotating pulley when the sheave segment is travelling along the sector of its revolution where it is unloaded from belt contact.

8. An adjustable drive ratio multiple-step belt transmission as claimed in claim 7, in which:

said spring means is a resilient spring finger integrally formed on each sheave segment, said spring finger engages said element in slidable relationship therewith.

9. An adjustable drive ratio multiple-step belt transmission as claimed in claim 8, in which:

said sheave segment is a one-piece unit molded from strong, rigid elastic material having a specific gravity less than one-sixth that of zinc for minimizing the centrifugal force on the unloaded sheave segment, and said material has a Young's modulus of elasticity of less than 2,000,000 pounds per square inch for providing an appropriate resilient spring force for enabling the sheave segment to be shifted radially past said steps while using only moderate shifting force.

10. An adjustable drive ratio multiple-step belt transmission as claimed in claim 8, in which:

each sheave segment is a one-piece unit injection molded from plastic.

11. An adjustable drive ratio multiple-step belt transmission as claimed in claim 1, in which:

said plurality of trackways comprises a plurality of slots in said pulley.

said sequence of steps are formed along the side of each slot toward which the dominant tension pulls when the transmission is running.

the opposite side of each slot is smooth, and each sheave segment includes spring means for exerting force against said smooth side of the slot for holding the sheave segment gripping tooth means in engagement with the sequence of steps for resisting dislodgement of the sheave segment from its adjusted position by centrifugal action in the rotating pulley during the portion of each revolution when the sheave segment is out of contact with the belt.

12. An adjustable drive ratio multiple-step belt transmission as claimed in claim 11, in which:

said spring means is a resilient spring finger integrally formed on the sheave segment, said spring finger engages said smooth side of said slot for exerting force against said smooth side, and said spring finger is slidable along said smooth side of the slot.

13. An adjustable drive ratio multiple-step transmission as claimed in claim 11, in which:

said sheave segments each include a pair of projections on opposite sides thereof extending in opposite axial directions and being axially aligned, said projections extend axially beyond opposite sides of the pulley, and shift means are positioned on opposite sides of the pulley for simultaneously and equally engaging said projections on each unloaded sheave segment during shifting of the unloaded sheave segment along its slot.

14. An adjustable drive ratio multiple-step transmission as claimed in claim 1, in which:

said belt-engaging portion of each sheave segment is curved convex outwardly having multiple-v grooves therein, and the radius of curvature of said curved convex belt-engaging portion of each sheave segment is less than the minimum effective adjustable radius of the pulley.

15. A pulley of adjustable effective diameter for use in a belt transmission, said pulley comprising:
   at least one member rotatable about an axis,
   said member including a plurality of trackways each extending from a respective inner position nearer to the axis to a respective outer position further from the axis,
   a plurality of steps extending along near each trackway for providing a sequence of steps along each trackway,
   a plurality of belt-load-locking sheave elements adjustable in position along the respective trackways,
   each sheave element including gripping tooth means engageable with the sequence of steps near its respective trackway for holding the sheave element in an adjusted position,
   each sheave element including a belt-engaging portion which is positioned on the sheave element for causing belt loading by contact of the belt upon said portion of the sheave element during running of the transmission to exert torque in a predetermined sense upon the sheave element relative to its trackway,
   the sequence of steps along each trackway and the gripping tooth means of the sheave element on the respective trackway being oriented with respect to each other for said torque produced by said belt loading upon said portion of the sheave element to force said gripping tooth means of the sheave element into gripping engagement with the sequence of steps near its respective trackway for preventing the sheave element from moving inwardly along its trackway from its adjusted position when subjected to belt loading, and
   means for urging said gripping tooth means of the sheave element into engagement with the sequence of steps near its trackway for resisting dislodgement of the sheave element from its adjusted position by centrifugal action of the rotating pulley when the sheave element is travelling along the sector of its revolution where it is unloaded from belt contact.

16. A pulley of adjustable effective diameter for use in a belt transmission, said pulley comprising:
   at least one member rotatable about an axis,
   said member including a plurality of trackways each extending from a respective inner position nearer to the axis to a respective outer position further from the axis,
   a plurality of steps extending along near each trackway for providing a sequence of steps along each trackway,
   a plurality of belt-load-locking sheave elements adjustable in position along the respective trackways,
   each sheave element including gripping tooth means engageable with the sequence of steps near its respective trackway for holding the sheave element in an adjusted position,
   each sheave element including a belt-engaging portion which is positioned on the sheave element for causing belt loading upon said portion of the sheave element during running of the transmission to force said gripping tooth means of the sheave element into gripping engagement with the sequence of steps near its respective trackway for preventing the sheave element from moving inwardly along its trackway away from its adjusted position when subjected to belt loading;
   means for urging said gripping tooth means of the sheave element into engagement with the sequence of steps near its trackway,
   said belt-engaging portion of each sleeve element being offset in a circumferential direction with respect to the centerline of the trackway which the respective sheave element is adjustable,
   said portion of each sheave element being offset in the circumferential direction opposite to the direction of rotation of the pulley when the pulley is used as the driving pulley in the transmission and being offset in the circumferential direction the same as the direction of rotation of the pulley when the pulley is used as the driven pulley in the transmission for causing the belt loading upon said portion of the sheave element to exert torque in a predetermined sense upon the sheave element relative to its trackway, and
   the sequence of steps along its trackway and its gripping tooth means are oriented for said torque to force said gripping tooth means into engagement with said sequence of steps for preventing the sheave element from moving inwardly along its trackway from its adjusted position when subjected to belt loading.

17. A pulley of adjustable effective diameter as claimed in claim 16 for use in a belt transmission, in which:
   the gripping tooth means on each sheave element in a driving pulley are located on the rear side of the sheave element with respect to the direction of driving pulley rotation and the gripping tooth means on each sheave element in a driven pulley are located on the front side of the sheave element with respect to the direction of driven pulley rotation.

18. A pulley of adjustable effective diameter as claimed in claim 16 use in a belt transmission, in which:
   said means for urging said gripping tooth means of the sheave element into engagement with the sequence of steps near its trackway during travel of the sheave element in the unloaded sector of each revolution includes spring means operatively associated with each sheave element.

19. A pulley of adjustable effective diameter as claimed in claim 18 for use in a belt transmission, in which:
   the pulley member includes a plurality of surfaces each spaced from and extending parallel with a respective sequence of steps along each trackway,
   each sheave element includes spring means mounted thereon for exerting spring force against the respective surface for urging the gripping tooth means of the sheave element into engagement with the sequence of steps.

20. A pulley of adjustable effective diameter as claimed in claim 16 for use in an adjustable ratio, multiple-step belt transmission, in which:
   each sheave element includes a pair of axially aligned projections extending in opposite axial directions from opposite sides of the sheave element,
   said pair of projections on each sheave element are offset in the opposite circumferential direction from the belt-engaging portion, and shift means are engageable with said projections when the belt-engaging portion of each sheave element is unloaded from the belt for reducing the effective pulley diameter by pushing inwardly on said projections for applying torque to each sheave element in the opposite sense from the belt loading on said belt-engaging portion for urging said gripping tooth means out of engagement with the sequence of steps for enabling the respective unloaded sheave element to be shifted inwardly along its respective trackway.

21. A pulley of adjustable effective diameter as claimed in claim 20 for use in an adjustable drive ratio multiple-step belt transmission, in which:

said pulley member includes a hollow shaft rotatable about said pulley axis, a flyball mass is movably mounted in said hollow shaft, spring means associated with said mass normally hold said mass in a first position near said axis, said flyball mass moves outwardly by centrifugal action against the force of said spring means to a second position farther from said axis when the rotational speed of the pulley exceeds a predetermined minimum limit appropriate for safely operating said shift means, and safety interlock mechanism responsive to the position of said flyball mass, said safety interlock mechanism being operatively associated with said shift means for preventing operation of said shift means unless said flyball mass has moved to its second position for assuring that the rotational speed of the pulley exceeds said predetermined appropriate minimum safe limit before shifting of the drive ratio can take place.

22. A pulley of adjustable effective diameter as claimed in claim 16, in which:

said steps in said sequence are uniformly radially spaced apart by distances of 0.060 of an inch per step.

23. A pulley of adjustable effective diameter as claimed in claim 22, in which:

there are forty-one steps for providing forty-one adjusted effective diameters of said pulley.

24. An adjustable drive ratio multiple-step belt transmission comprising:

a pair of pulleys of adjustable effective diameter, each pulley including at least one member rotatably mounted on frame means for rotation about an axis, the axes of rotation of said two pulleys being in spaced parallel relationship and said pulleys being in alignment with each other in the same plane, each such rotatable member of a pulley including a plurality of trackways each extending from a respective inner position nearer to the axis to a respective outer position further from the axis, each trackway having a centerline, a plurality of steps extending along near each trackway for providing a sequence of steps along each trackway, a plurality of belt-load-locking sheave elements adjustable in position along the respective trackways, each sheave element in each pulley including gripping tooth means engageable with the sequence of steps near its respective trackway for holding the sheave element in an adjusted position, a belt running around said two pulleys, each sheave element in each pulley including a belt-engaging portion which is positioned on the sheave element offset from the centerline of its respective trackway in a circumferential direction for causing belt loading upon said portion of the sheave element during running of the transmission to force said gripping tooth means into gripping engagement with the sequence of steps near its respective trackway for preventing the sheave element from moving inwardly along its trackway away from its adjusted position when subjected to belt loading, means for urging said gripping tooth means of the sheave element in each pulley into engagement with the sequence of steps near its trackway during travel of the sheave element in the unloaded sector of each revolution when the belt-engaging portion of the sheave element is not subject to belt loading for preventing dislodging of the sheave element from its adjusted position when not under belt loading, each of said sheave elements having a pair of projections extending from opposite sides in a direction parallel with the axis of pulley rotation, one of said pulleys being a driving pulley and one of said pulleys being a driven pulley, and shift means acting when the pulleys are rotating simultaneously engaging both of the projections of the respective sheave elements when they are travelling in their unloaded sector for applying balanced forces on opposite sides of each sheave element for shifting each of the unloaded sheave elements along their respective trackways to another adjusted position along the sequence of steps for increasing the effective diameter of one of the pulleys while decreasing the effective diameter of the other of the pulleys for adjusting the drive ratio of said belt transmission.

25. An adjustable drive ratio multiple-step belt transmission as claimed in claim 24, in which:

a plurality of idler wheels are each movably mounted and engage the return portion of the belt as it returns from the driving pulley to the driven pulley for urging the belt into a U-shape between the driven and driving pulleys, resilient means acts upon each of said movably mounted idler wheels for urging each of said idler wheels toward increasing the width of said U-shape for creating slight tension in said belt, and at least one of said movably mounted idler wheels is capable of moving closer to the axis of at least one of said pulleys than the maximum effective adjustable diameter of that pulley.

26. An adjustable drive ratio multiple-step belt transmission as claimed in claim 25, in which:

said movably mounted idler wheels are mounted upon a movable support which is movably mounted upon said frame means for allowing said idler wheels to move away from the axis of the pulley whose diameter is being increased and toward the axis of the pulley whose diameter is being decreased.

27. An adjustable drive ratio multiple-step belt transmission as claimed in claim 26, in which:

said movable support is a wishbone-shaped support pivotally mounted upon said frame means, said idler wheels are two in number mounted upon the respective arms of said wishbone-shaped support, and said arms serve as said resilient means resiliently spreading away from each other for urging said two idler wheels away from each other toward increasing the size of said U-shape for creating slight tension in said belt.

28. An adjustable drive ratio multiple-step belt transmission as claimed in claim 25, in which:
the "wrap" of the belt around the driving and driven pulleys is at least 230° on each pulley in every adjusted drive ratio.

29. An adjustable drive ratio multiple-step belt transmission, as claimed in claim 25, in which:
the driving and driven pulleys each includes a pair of axially spaced disc-like members,
said belt-engaging portions of the sheave elements in the driving and driven pulleys are located between said pair of axially spaced disc-like members,
the belt engages said belt-engaging portions of the sheave elements between said pair of disc-like members, and
at least one of said movably mounted idler wheels enters into the space between said pair of disc-like members of at least one of said pulleys.

30. An adjustable drive ratio multiple-step belt transmission comprising:
a pair of pulleys of adjustable effective diameter,
each pulley including at least one member rotatably mounted on frame means for rotation about an axis,
the axes of rotation of said two pulleys being in spaced parallel relationship and said pulleys being in alignment with each other,
each such rotatable member of a pulley including a plurality of trackways each extending from a respective inner position nearer to the axis to a respective outer position further from the axis,
a plurality of steps extending along near each trackway for providing a sequence of steps along each trackway,
a plurality of belt-load-locking sheave elements adjustable in position along the respective trackways,
each sheave element in each pulley including gripping tooth means engageable with the sequence of steps near its respective trackway for holding the sheave element in an adjusted position,
a belt running around said two pulleys,
each sheave element in each pulley including a belt-engaging portion which is positioned on the sheave element for causing belt loading upon said portion of the sheave element during running of the transmission to force said gripping tooth means into gripping engagement with the sequence of steps near its respective trackway for preventing the sheave element from moving inwardly along its trackway away from its adjusted position when subjected to belt loading,
means for urging said gripping tooth means of the sheave elements in each pulley into engagement with the sequence of steps near its trackway during travel of the sheave element in the unloaded sector of each revolution when the belt-engaging portion of the sheave element is not subjected to belt loading for preventing dislodging of the sheave element from its adjusted position when not under belt loading,
one of said pulleys being a driven pulley and one of said pulleys being a driven pulley,
shift means acting when the pulleys are rotating for engaging the respective sheave elements when they are traveling in their unloaded sector for shifting each of the unloaded sheave elements along their respective trackways to another adjusted position along the sequence of steps for increasing the effective diameter of one of the pulleys while decreasing the effective diameter of the other of the pulleys for adjusting the drive ratio of said belt transmission,
two movably mounted idler wheels engaging the return portion of the belt as it returns from the driving pulley to the driven pulley for urging the belt into a U-shape between the driven and driving pulleys,
resilient means for urging said idler wheels toward increasing the size of said U-shape for creating slight tension in said belt,
said movably mounted idler wheels being mounted upon a movable support which is movably mounted upon said frame means for allowing said idler wheels to move away from the axis of the pulley whose diameter is being increased and toward the axis of the pulley whose diameter is being decreased,
said movable support being a wishbone-shaped support pivotally mounted upon said frame means,
said two idler wheels being rotatably mounted upon the respective arms of said wishbone-shaped support,
said arms serve as said resilient means resiliently spreading away from each other for urging said two idler wheels away from each other toward increasing the size of said U-shape for creating slight tension in said belt,
the driving and driven pulleys each including two axially spaced members mounted on the frame means for rotation about their respective axes,
said belt-engaging portions of the sheave elements in the driving and driven pulleys being located between the two axially spaced members,
the belt engaging said belt-engaging portions of the sheave elements between said axially spaced members, and
at least one of said idler wheels entering into the space between the axially spaced members of the respective pulley as said wishbone-shaped support pivots.

31. An adjustable drive ratio multiple-step belt transmission comprising:
at least one pulley rotatable about an axis,
said pulley including a pair of parallel, axially spaced disc-like members,
each disc-like member including a plurality of slots extending from respective inner ends nearer to the axis to respective outer ends farther from the axis,
said slots in said two discs being axially aligned forming a plurality of pairs of spaced parallel slots,
a plurality of sheave segments, a respective sheave segment being captivated in each pair of slots and being shiftable in position along the pair of slots toward and away from the axis of rotation,
each sheave segment including a belt-engaging portion located between said disc-like members,
said belt-engaging portion of a sheave segment being offset in a circumferential direction from the centerline of the slots for causing belt loading thereon to apply torque to the sheave segment in a predetermined direction,
gripping tooth means on each sheave segment, said gripping tooth means being located on said sheave segment in a position for being urged in a predetermined direction by said torque resulting from said belt loading, said slots each having a sequence of steps extending along near the side of the slot toward which torque urges said gripping tooth means for causing said torque to hold said gripping tooth means in engagement with said sequence of steps for holding the sheave segment in its adjusted position while under belt loading, means for normally urging said gripping tooth means of each sheave segment toward engagement with said sequence of steps for preventing dislodgement of the sheave segment during the portion of each revolution when said belt-engaging portion of the sheave segment is not under belt loading, and shift means engageable with the respective sheave segments when unloaded by the belt for shifting the unloaded sheave segments along the pairs of slots for changing the effective diameter of the pulley for changing the drive ratio.

32. An adjustable drive ratio multiple-step belt transmission as claimed in claim 31, in which:

said sequence of steps is formed along the edge of each slot on the side of the slot toward which said belt-engaging portion is offset.

33. An adjustable drive ratio multiple-step belt transmission as claimed in claim 31, in which:

each sheave segment includes a pair of trunnion-like projections extending from its opposite sides, said pair of trunnion-like projections on each sheave segment extend in an axial direction beyond the disc-like members, said shift means include a first pair of movable shift cams positioned near one axial side of said pulley engageable with the trunnion-like projections extending from the pulley on said one side and a second pair of movable shift cams positioned near the opposite axial side of the pulley engageable with the trunnion-like projections extending from the pulley on said opposite side, and said first and second pair of shift cams each include inner shift cams simultaneously engageable with said projections for pushing outwardly on said projections for shifting the unloaded sheave segments outwardly along the respective slots for enlarging the effective diameter of the pulley, and said first and second pair of shift cams each include outer shift cams simultaneously engageable with said projections for pushing inwardly on said projections for shifting the unloaded sheave segments inwardly along the respective slots for decreasing the effective diameter of the pulley.

34. An adjustable drive ratio multiple-step belt transmission as claimed in claim 33, in which:

said first pair of shift cams are carried by a first movable shift cam member positioned near said one side of the pulley, said second pair of shift cams are carried by a second movable shift cam member positioned near said other side of the pulley, and means are provided for mechanically ganging said first and second movable shift cam members together for simultaneously moving said shift cam members equal amounts for equally balancing the pushing actions of the respective shift cams on the pairs of trunnion-like projections.

35. An adjustable drive ratio multiple-step belt transmission as claimed in claim 34, in which:

said means for mechanically ganging said first and second movable shift cam members include first and second gear racks extending along said first and second members respectively, a rotatable pinion gear shaft whose axis extends parallel with the axis of said pulley, pinion gear means on said shaft engaging said first and second gear racks for moving said first and second shift cam members simultaneously equal amounts upon rotation of said pinion shaft about its axis, and control means for rotating said pinion gear shaft for changing the effective pulley diameter.

36. An adjustable drive ratio multiple-step belt transmission as claimed in claim 35 in which:

said control means for rotating said pinion gear shaft is remotely controlled.

37. An adjustable drive ratio multiple-step belt transmission as claimed in claim 35, in which:

said control means for rotating said pinion gear shaft includes a round member on said shaft having a plurality of detent notches in its periphery, each of said notches corresponding to a respective adjusted effective diameter of said pulley, a detent element engagable with the notched periphery of said round member, and spring means for urging said detent toward said notched preiphery for producing a definite step-by-step shifting action as said detent engages in the respective notches as said shaft is rotated.

38. An adjustable drive ratio multiple-step belt transmission as claimed in claim 37, in which:

rotational-speed-responsive interlock mechanism is coupled to said pulley, said interlock mechanism being operatively associated with said detent for locking said detent against said notched periphery for preventing rotation of said shaft when the pulley is rotating slower than a predetermined limit for preventing shifting of the drive ratio when the pulley is rotating slower than said limit, and for unlocking said detent when the pulley is rotating faster than said limit for permitting shifting of the drive ratio to occur.

39. An adjustable drive ratio multiple-step belt transmission as claimed in claim 37, in which:

said notches are angularly spaced apart 9° around the periphery of said round member.

40. An adjustable drive ratio multiple-step belt transmission comprising:

a pair of pulleys of adjustable effective diameter, each pulley including at least one member rotatably mounted on frame means for rotation about an axis, the axes of rotation of said two pulleys being in spaced parallel relationship and said pulleys being in alignment with each other, each such rotatable member of a pulley including a plurality of trackways each extending from a respective inner position nearer to the axis to a respective outer position further from the axis, a plurality of steps extending along near each trackway for providing a sequence of steps along each trackway, a plurality of belt-load-locking sheave elements adjustable in position along the respective trackways, each sheave element in each pulley including gripping tooth means engageable with the sequence of steps near its respective trackway for holding the sheave element in an adjusted position, a belt running around said two pulleys, each sheave element in each pulley including a belt-engaging portion which is positioned on the sheave element for causing belt loading upon said portion of the sheave element during running of the transmission to force said gripping tooth means into gripping engagement with the sequence of steps near its respective trackway for preventing the sheave element from moving inwardly along its trackway from its adjusted position when subjected to belt loading, means for urging said gripping tooth means of the sheave elements in each pulley into engagement with the sequence of steps near its trackway during travel of the sheave element in the unloaded sector of each revolution when the belt-engaging portion of sheave element is not subjected to belt loading for preventing dislodging of the sheave element from its adjusted position when not under belt loading, one of said pulleys being a driving pulley and one of said pulleys being a driven pulley, shift means acting when the pulleys are rotating for engaging the respective sheave elements when they are travelling in their unloaded sector for shifting each of the unloaded sheave elements during their respective trackways to another adjusted position along the sequence of steps for increasing the effective diameter of one of the pulleys while decreasing the effective diameter of the other of the pulleys for adjusting the drive ratio of said belt transmission, a plurality of movably mounted idler wheels engaging the return portion of the belt as it returns from the driving pulley to the driven pulley for urging the belt into a U-shape between the driven and driving pulleys, and resilient means for urging said idler wheels toward increasing the size of said U-shape for creating slight tension in said belt, the "wrap" of the belt around the driving and driven pulleys being at least 230° on each pulley in every adjusted drive ratio, said belt being a multiple-v belt having an inner surface with multiple parallel V-shaped ribs and a relatively smooth outer surface, said belt-engaging portions of said sheave elements containing multiple-v grooves for engagement by said multiple parallel ribs, said idler wheels being flangeless wheels engaging the smooth outer surface of said belt forming it into said U-shape between said driving and driven pulleys, and a pair of fixed, spaced slippery guides straddling said U-shaped portion of the belt and having clearance for said flangeless wheels to avoid mechanical interference with said pair of guides which guide the belt.

41. A sheave segment for use in a belt-type pulley of adjustable diameter comprising:

a region on said sheave segment for engaging a belt running around a pulley having an axis of rotation, a pair of axially spaced members on said sheave segment, said members being spaced on opposite sides of said belt-engaging region in straddling relationship with respect to said region for mounting in trackways on the pulley, said members each having gripping tooth means thereon for engagement in the pulley for holding said sheave segment at any selected position among a plurality of adjusted positions at different distances from the axis of the pulley, and at least one projection extending in an axial direction from said sheave segment for use in moving the sheave segment to the various selected adjusted positions in the pulley.

42. A sheave segment for use in a belt-type pulley of adjustable diameter as claimed in claim 41, in which:

there are a pair of said projections extending in opposite axial directions from opposite axial sides of said sheave segment, and said projections are axially aligned for use in moving the sheave segment by applying equal forces in balanced relationship to said pair of projections.

43. A sheave segment for use in a belt-type pulley of adjustable diameter as claimed in claim 41, in which:

said pair of axially spaced members are a pair of ear-like members straddling said belt-engaging region, said ear-like members extend outwardly radially beyond said belt-engaging region, and said gripping tooth means are at least partially located on said ear-like members at a greater radial distance from said axis than said belt-engaging region.

44. A sheave segment for use in a belt-type pulley of adjustable diameter as claimed in claim 41, in which:

said belt-engaging region and said projection are eccentrically located on said sheave segment as seen looking in an axial direction, and a plane parallel with the axis of rotation passing through the center of said projection and passing through the effective center of said belt-engaging region misses the axis of rotation.

45. A sheave segment for use in a belt-type pulley of adjustable diameter as claimed in claim 44, in which:

said belt-engaging region is eccentrically located on said sheave segment as seen looking in an axial direction for causing the loading of a belt on said belt-engaging region to apply torque to the sheave segment for urging the gripping tooth means toward engagement in the pulley.

46. A sheave segment for use in a belt-type pulley of adjustable diameter as claimed in claim 45, in which:

said gripping tooth means include a plurality of saw-tooth shaped teeth having a plurality of gripping surfaces extending in a generally circumferential direction, and said gripping surfaces face inwardly generally toward the axis for resisting inward movement of the sheave segment as a result of belt loading.

47. A sheave segment for use in a belt-type pulley of adjustable diameter as claimed in claim 46, in which:

there are a pair of said projections extending in opposite axial directions from opposite axial sides of said sheave segment, said projections are axially aligned for use in moving the sheave segment by applying equal forces in balanced relationship to said pair of projections, and said pair of projections are eccentrically located on said sheave segment as seen looking in an axial direction for causing radially inwardly directed forces on said projections to apply torque to the sheave segment for urging the gripping tooth means away from engagement in the pulley for enabling the sheave segment to be moved inwardly closer to the axis by said inwardly directed forces.

48. A sheave segment for use in a belt-type pulley of adjustable diameter as claimed in claim 47, in which:
   said sheave segment is formed of plastic, and
   at least one resilient spring finger projects from said sheave segment for pressing against the pulley for urging said gripping tooth means toward engagement in the pulley.

49. A sheave segment for use in a belt-type pulley of adjustable diameter, as claimed in claim 48, in which:
   said gripping tooth means on each of said members is a plurality of saw-tooth shaped gripping teeth uniformly spaced in row, and
   at least one of said gripping teeth is truncated for facilitating shifting of the sheave segment into different adjusted positions in the pulley.

* * * * *